(12) United States Patent
Mier

(10) Patent No.: US 10,841,466 B1
(45) Date of Patent: Nov. 17, 2020

(54) CAMERA MOUNTING SYSTEM FOR INSPECTION

(71) Applicant: Veteran's Choice Contracting, LLC, Davenport, IA (US)

(72) Inventor: Shaine Mier, Davenport, IA (US)

(73) Assignee: Veteran's Choice Contracting, LLC, Davenport, IA (US)

(*) Notice: Subject to any disclaimer, the term of this patent is extended or adjusted under 35 U.S.C. 154(b) by 0 days.

(21) Appl. No.: 16/875,901

(22) Filed: May 15, 2020

Related U.S. Application Data

(60) Provisional application No. 62/848,010, filed on May 15, 2019.

(51) Int. Cl.
| | | |
|---|---|---|
| *H04N 5/225* | (2006.01) | |
| *B63B 35/28* | (2006.01) | |
| *B63B 83/00* | (2020.01) | |
| *G03B 17/56* | (2006.01) | |
| *G03B 29/00* | (2006.01) | |

(52) U.S. Cl.
CPC .......... *H04N 5/2252* (2013.01); *B63B 35/28* (2013.01); *B63B 83/00* (2020.01); *G03B 17/561* (2013.01); *G03B 29/00* (2013.01)

(58) Field of Classification Search
None
See application file for complete search history.

(56) References Cited

U.S. PATENT DOCUMENTS

| | | | | |
|---|---|---|---|---|
| 4,621,786 | A * | 11/1986 | Greenlee | F16M 11/2021 248/123.11 |
| 4,751,540 | A * | 6/1988 | Jones | F16M 11/105 248/168 |
| 5,538,212 | A * | 7/1996 | Kennedy | G03B 17/561 248/215 |
| 6,425,697 | B1 * | 7/2002 | Potts | F41A 33/00 352/243 |
| 8,142,019 | B2 * | 3/2012 | Hernandez | F16M 11/425 348/373 |
| 2012/0263445 | A1 * | 10/2012 | Beasley | F16M 11/2064 396/12 |
| 2016/0216596 | A1 * | 7/2016 | Hart | G03B 17/561 |
| 2018/0046067 | A1 * | 2/2018 | Roots | F16M 13/00 |
| 2019/0196304 | A1 * | 6/2019 | Jeske | F16B 23/0007 |

* cited by examiner

*Primary Examiner* — William B Perkey
(74) *Attorney, Agent, or Firm* — Hamilton IP Law, PC; Jay R. Hamilton; Charles A. Damschen

(57) ABSTRACT

A camera mounting system for inspection is intended to be used with lights and a camera connected to a data transmission system to allow temporary installation of the mounting system upon a barge hatch to allow for visual confirmation via a camera or other digital imaging system of the interior space of the barge. The system is intended to be used to reduce personnel exposure to the interior of barges. The camera mounting system is portable and may be folded. The camera mounting system allows use with hatches generally rectangular at the access hatch as well as hatches having rounded or sweeping ninety degree type access hatches with the mounting system providing multiple positions for placement of the camera for either hatch type to ensure repeatability of the visual confirmation between various barge and barge configurations.

20 Claims, 34 Drawing Sheets

CAMERA MOUNTING SYSTEM FOR INSPECTION

CROSS REFERENCE TO RELATED APPLICATIONS

The present application claims priority from provisional U.S. App. Nos. 62/848,010 filed on May 15, 2019, which application is incorporated by reference herein in its entirety.

FIELD OF THE INVENTION

The present disclosure relates to a camera mounting system for barge inspection which does not require personnel exposure to the interior of a barge and allows repeatability in inspections without limitation and/or restriction, as shown and disclosed herein.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable.

AUTHORIZATION PURSUANT TO 37 C.F.R. § 1.171 (C)

A portion of the disclosure of this patent document may contain material that is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

SUMMARY OF THE INVENTION—ILLUSTRATIVE EMBODIMENTS

A camera mounting system for inspection of a barge hold is disclosed having an L-shaped support frame. The support frame is further comprised of a first support frame having a first end and a second end. The first support frame is configured to engage with and rest upon a first portion of a perimeter of a barge hatch positioned above a barge hold in a barge lid. As shown in the accompanying figures, there is also a second support frame, which also has a first end and a second end. The second end of the first support is connected to the second end of the second support frame. In at least one embodiment, the first support and the second support are pivotably connected. In at least one embodiment, the first support and the second support are not pivotably connected. One of ordinary skill will appreciate a pivotably connection may be produced via a pin, roller pin, rivet, bolt and nut or via a shoulder bolt and nut, all defined as fasteners, and used interchangeably, without limitation or restriction. The second support frame is configured to engage with and rest upon a second portion of the perimeter of the barge portal positioned above the barge hold. A mount cross brace is affixed to, positioned upon and connects to the first support frame and the support frame. The mount cross brace has a body which is generally triangular shape with a first support surface and a second support surface positioned across the body from each other. A support surface of the mount cross brace is defined as the portion of the mount cross brace which rests upon support frame surface. Generally, the first support surface is intended to rest upon the first support frame and the second support surface is intended to rest upon the second support frame. An opening is formed in the body having a perimeter and creating a u-shaped void proximate a center of the body. A plurality of holes may be positioned around the perimeter of the opening, in at least one embodiment. One of ordinary skill will appreciate that the holes around the perimeter of the opening are configured to engage with pins to secure the position of the mounting plate upon the mount cross brace. A shown herein, the pins may be positioned around the perimeter of the opening. One of ordinary skill will appreciate that the pins around the perimeter of the opening are configured to engage with holes positioned in the mounting plate to secure the position of the mounting plate upon the mount cross brace. One of ordinary skill will also appreciate that although the mounting plate and camera tube are shown as separate elements, they could be constructed as an integral unit.

In at least one embodiment, a slot is positioned in the body of the mount cross brace. The slot may extend between the first support surface and the second support surface. The slot is configured to allow adjustment of the position of the first support frame in relation to the second support frame as needed for suitable fit with the hatch during use or to collapse the camera mounting system for ease of transport and storage. As will be understood, the mount cross brace is affixed to one support frame via a bolt threaded through the mount cross brace and into the one support frame. At the other end of the slot, another bolt, having a knob end, is threaded through the mount cross brace and into the other support frame. The slot then allows the mount cross brace to slide along the interior of the slot when the knob end bolt is loosened so that the position of the support frame may be changed.

In at least one embodiment, the mount cross brace is fixed at one end and is configured with a hook at the other. The hook allows rapid engagement/disengagement with a bolt or other fastener affixed to the support frame so that the camera mounting system is collapsible.

In at least one embodiment, the mount cross brace is fixed and extends between the first support frame and the second support frame and is affixed thereto with pins or bolts. In this embodiment, it is not configured to allow adjustment of the position of the first support frame in relation to the second support frame. As will be understood, the mount cross brace is affixed to one support frame via a bolt threaded through the mount cross brace and into the one support frame. On the other side of the mount cross brace, another bolt or pin (fastener), is threaded or inserted through the mount cross brace and into the other support frame. The camera tube is configured with an upper end configured with a handle and a lower end configured for attachment of a camera. The camera tube is configured to be positioned in the mounting plate aperture and engage the mount cross brace via the opening to support the camera for inspection of the barge hold. As shown, the camera cord may be positioned in the camera tube. One of ordinary skill will appreciate that the handle may be removable via an interconnecting fit, such as a cover, or via threads allowing for secure removal and attachment with the upper end of the camera tube.

SUMMARY OF THE INVENTION—ILLUSTRATIVE METHOD OF USE

The method of mounting a camera for inspection of a barge hold may include configuring a lower side of a first support frame and a lower side of a second support frame for engagement with a portion of a barge hatch in a barge lid above a barge hold. The first support frame and the second support frame are connected and an angle is formed between each support frame. A mount cross brace may be configured to rest upon and attach to and between an upper side of the first support frame and upper side of the second support frame. An opening is formed in the mount cross brace forming a u-shaped void. A mounting plate having an aperture is positioned onto the mount cross brace over the opening. A camera tube may be inserted into the aperture of the mounting plate and a camera may be attached to a camera tube. The camera tube is then positioned into the opening of the mount cross brace and the camera is positioned in the barge hold for visual inspection of the barge hold using the camera.

DETAILED DESCRIPTION—BRIEF DESCRIPTION OF DRAWINGS

Figure 1A:
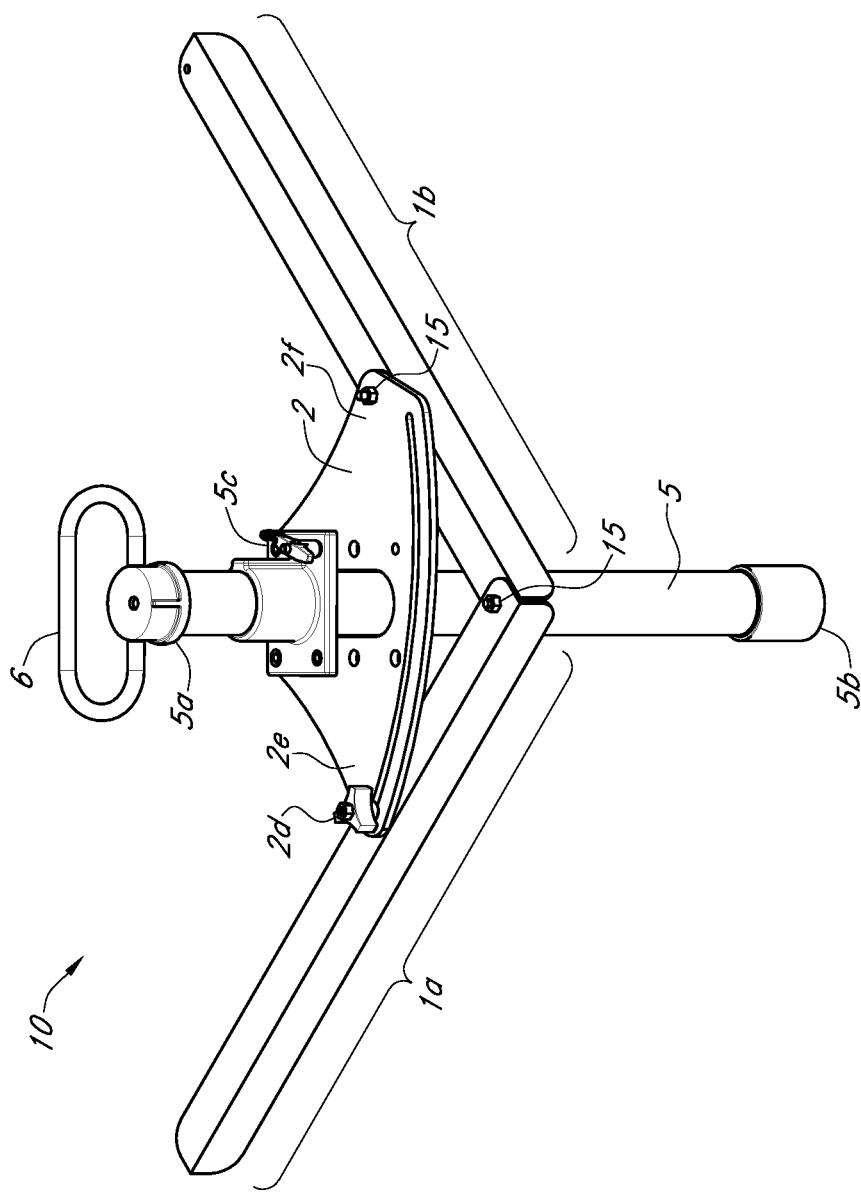
FIG. 1A is a top perspective view of the camera mounting system with a mount cross brace having a slot as shown and disclosed herein.

| DETAILED DESCRIPTION - LISTING OF ELEMENTS | |
|---|---|
| Element Description | Element Number |
| Support frame | 1 |
| First-support frame | 1a |
| Second-support frame | 1b |
| Mount cross brace (with slot) | 2 |
| Opening | 2a |
| Pin/index | 2b |
| Slot (for slide) | 2c |
| Knob (for slide) | 2d |
| First support surface | 2e |
| Second support surface | 2f |
| Mount cross brace (with side hook) | 3 |
| Opening | 3a |
| Pin/index | 3b |

-continued

| DETAILED DESCRIPTION - LISTING OF ELEMENTS | |
|---|---|
| Element Description | Element Number |
| Hook | 3c |
| Knob (for the hook) | 3d |
| First support surface | 3e |
| Second support surface | 3f |
| Fixed mount cross brace | 4 |
| Opening | 4a |
| Pin/index | 4b |
| Hook | 4c |
| Camera tube | 5 |
| Upper end | 5a |
| Lower end | 5b |
| Mounting plate | 5c |
| Hole(s) | 5d |
| Handle (cap) | 6 |
| Secured pin | 7 |
| Light | 8 |
| Camera | 9 |
| Camera mounting system | 10 |
| Barge lid | 11 |
| Barge hatch | 12 |
| Barge hold | 13 |
| Cable | 14 |
| Fastener | 15 |

DETAILED DESCRIPTION OF INVENTION

Before the present methods and apparatuses are disclosed and described, it is to be understood that the methods and apparatuses are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes¬ from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and apparatuses. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and apparatuses. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and apparatuses may be understood more readily by reference to the following detailed description of preferred aspects and the examples included therein and to the Figures and their previous and following description.

Before the various embodiments of the present invention are explained in detail, it is to be understood that the invention is not limited in its application to the details of construction and the arrangements of components set forth in the following description. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance.

The following detailed description is of the best currently contemplated modes of carrying out illustrative embodiments of the invention. The description is not to be taken in a limiting sense, but is made merely for the purpose of illustrating the general principles of the invention, since the scope of the invention is best defined by the appending claims. Various inventive features are described below herein that can each be used independently of one another or in combination with other features.

Illustrative Embodiment and Advantages of Invention

Figure 1B:
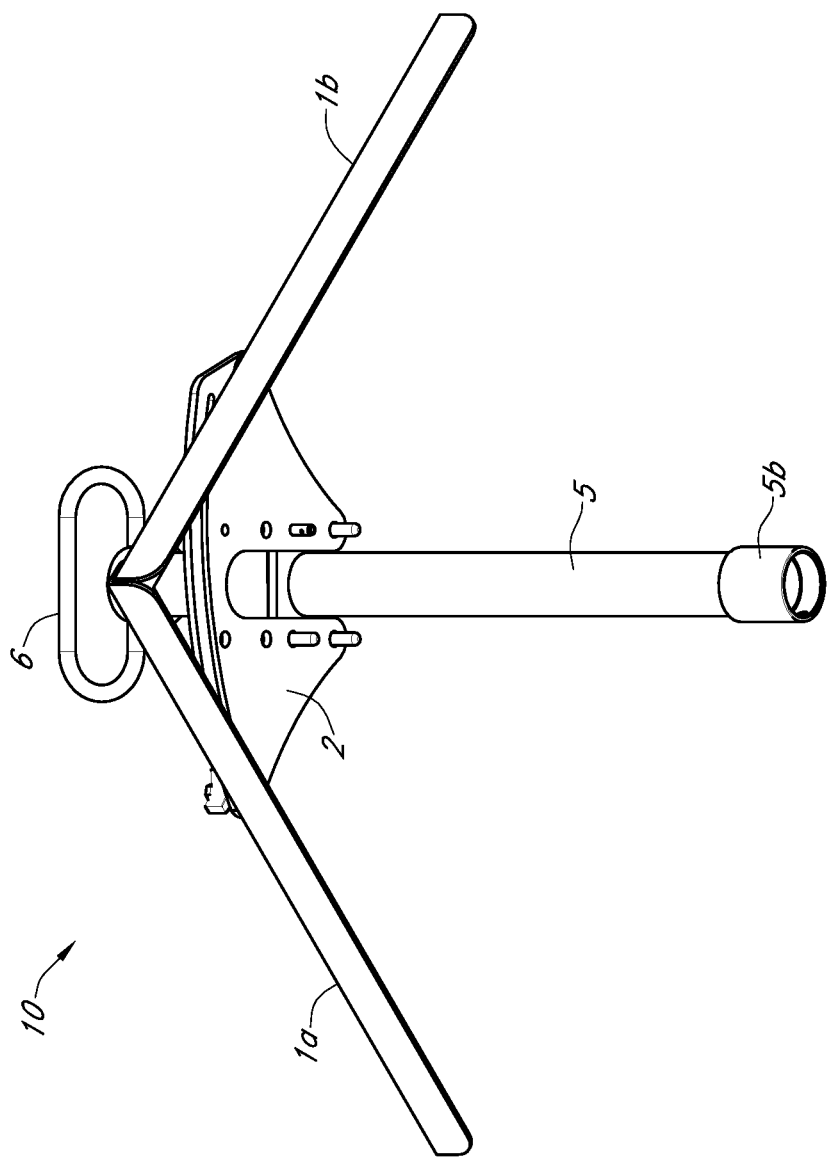
FIG. 1B is a bottom perspective view of the camera mounting system as shown in FIG. 1A herein.
Figure 1C:
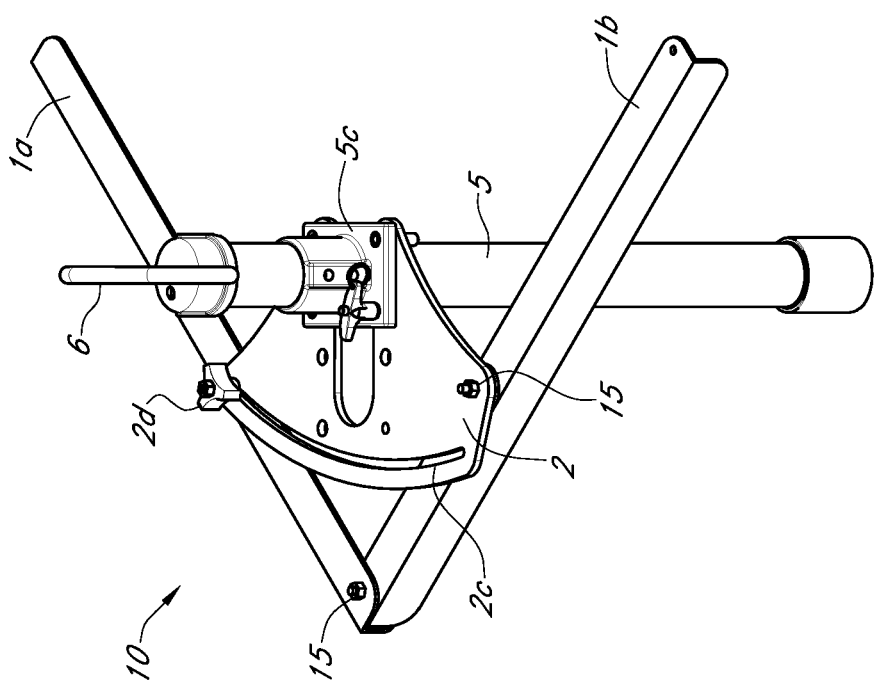
FIG. 1C is a left perspective side view of the camera mounting system as shown and disclosed herein.

FIG. 1A is a top perspective view of the camera mounting system 10 with a mount cross brace 2 having a slot 2c as shown and disclosed herein. In this configuration slot 2c allows the support frame 1 to be collapsible for ease of transport and portability by allowing adjustment (change) of the position of the first support frame 1a in relation to the second support frame 1b via adjustment of the knob. FIG. 1B is a bottom perspective view of the camera mounting system 10 as shown in FIG. 1A herein. FIG. 1C is a left perspective side view of the camera mounting system 10 as shown and disclosed herein.

Figure 1D:
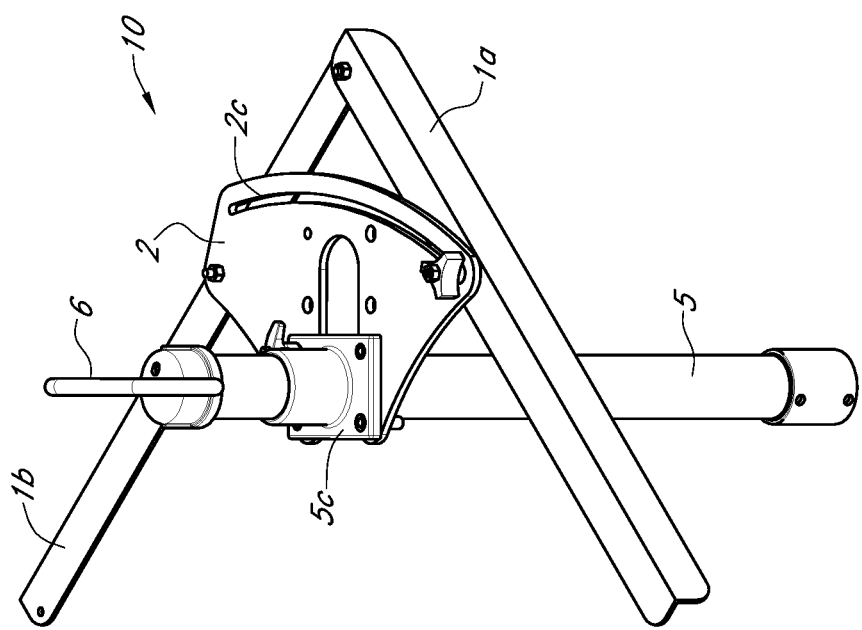
FIG. 1D is a right perspective side view of the camera mounting system as shown and disclosed herein.
Figure 1E:
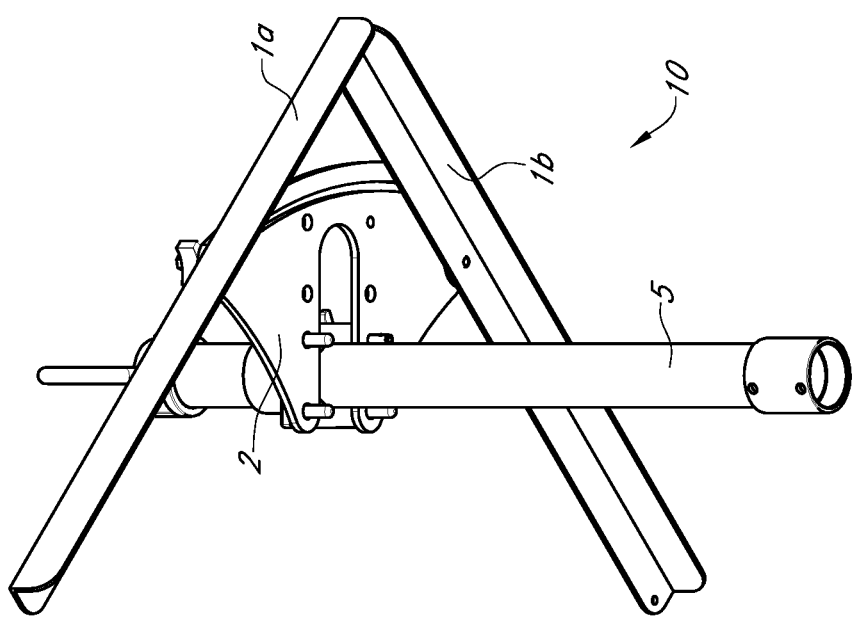
FIG. 1E is another left perspective side view of the camera mounting system as shown in FIG. 1C.

FIG. 1D is a right perspective side view of the camera mounting system 10 as shown and disclosed herein. FIG. 1E is another left perspective side view (bottom view) of the camera mounting system 10 as shown in FIG. 1C.

Figure 1F:
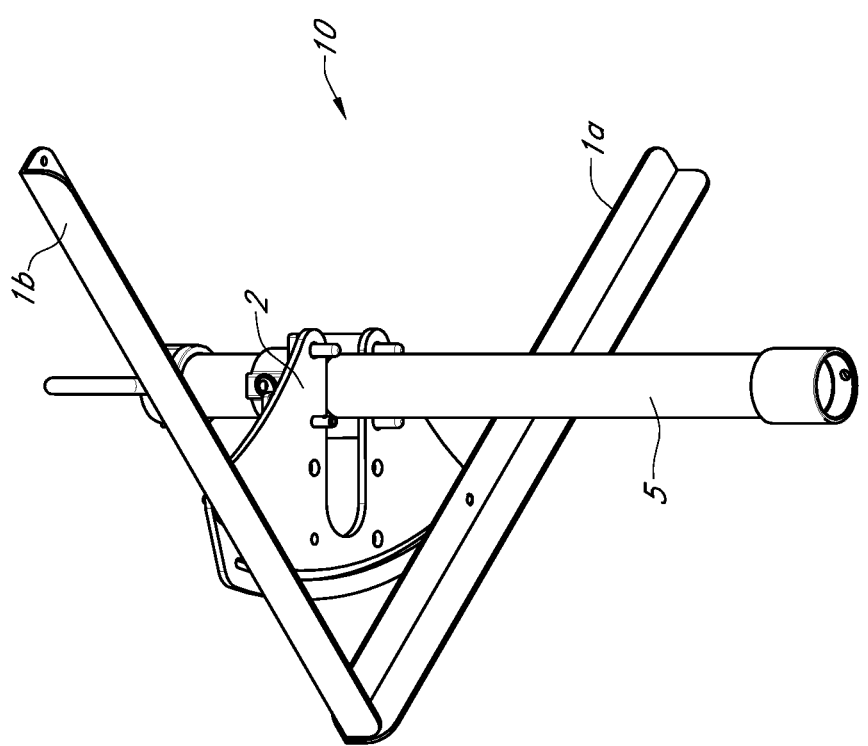
FIG. 1F is another right perspective side view (top view) of the camera mounting system as shown in FIG. 1D.
Figure 1G:
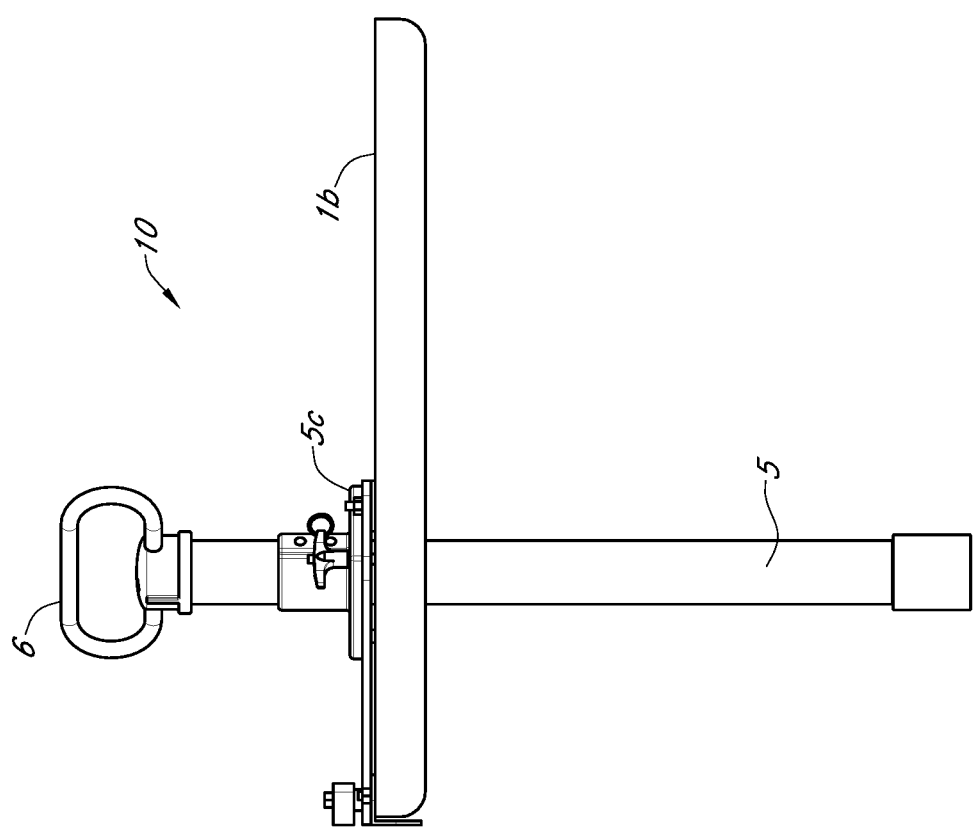
FIG. 1G is a left side view of the camera mounting system as shown in FIG. 1C as shown herein.
Figure 1H:
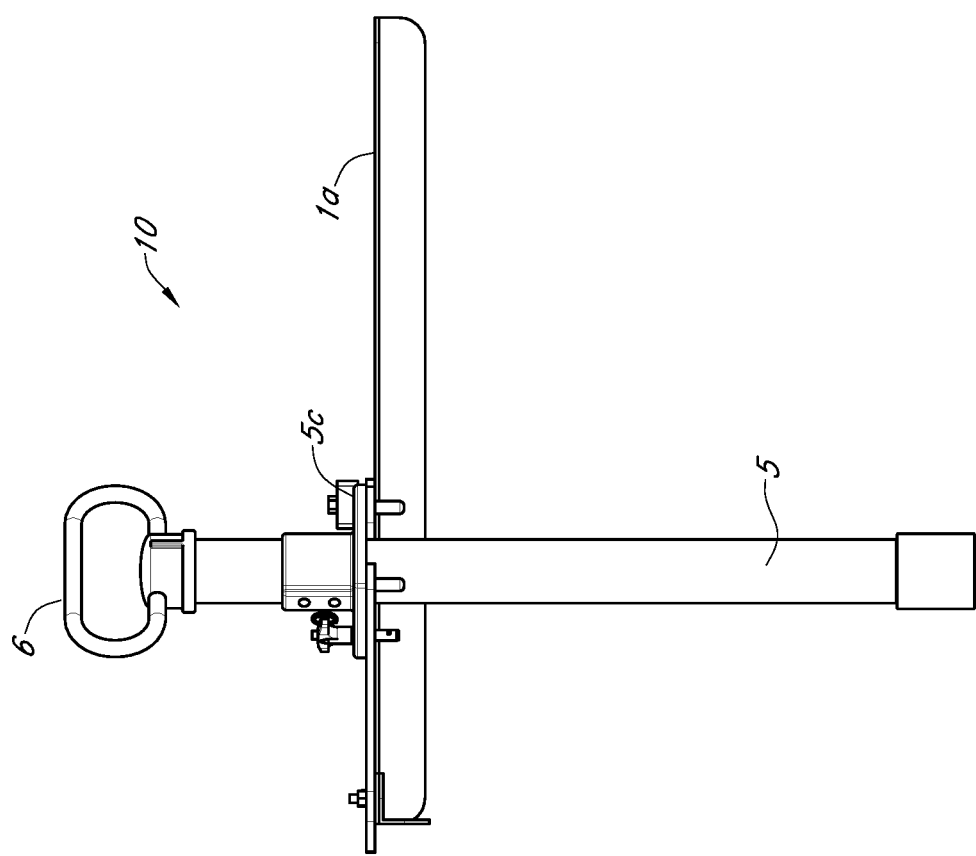
FIG. 1H is a right-side view of the camera mounting system as shown in FIG. 1D as shown herein.
Figure 1I:
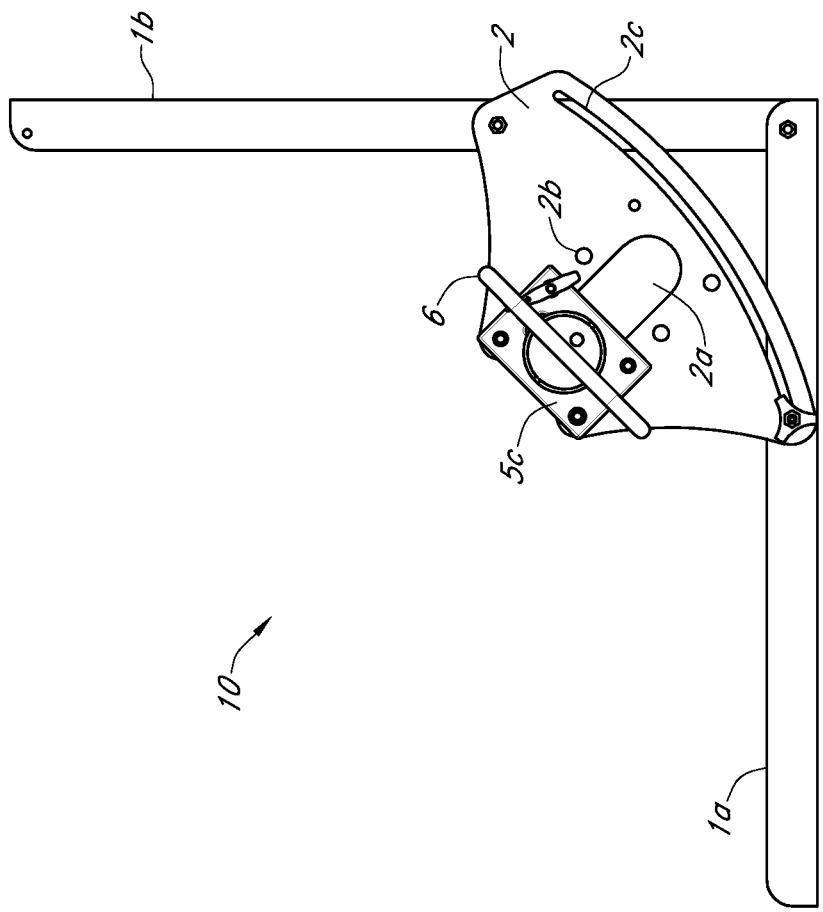
FIG. 1I is a top view of the camera mounting system as shown in FIG. 1A as shown herein.
Figure 1J:
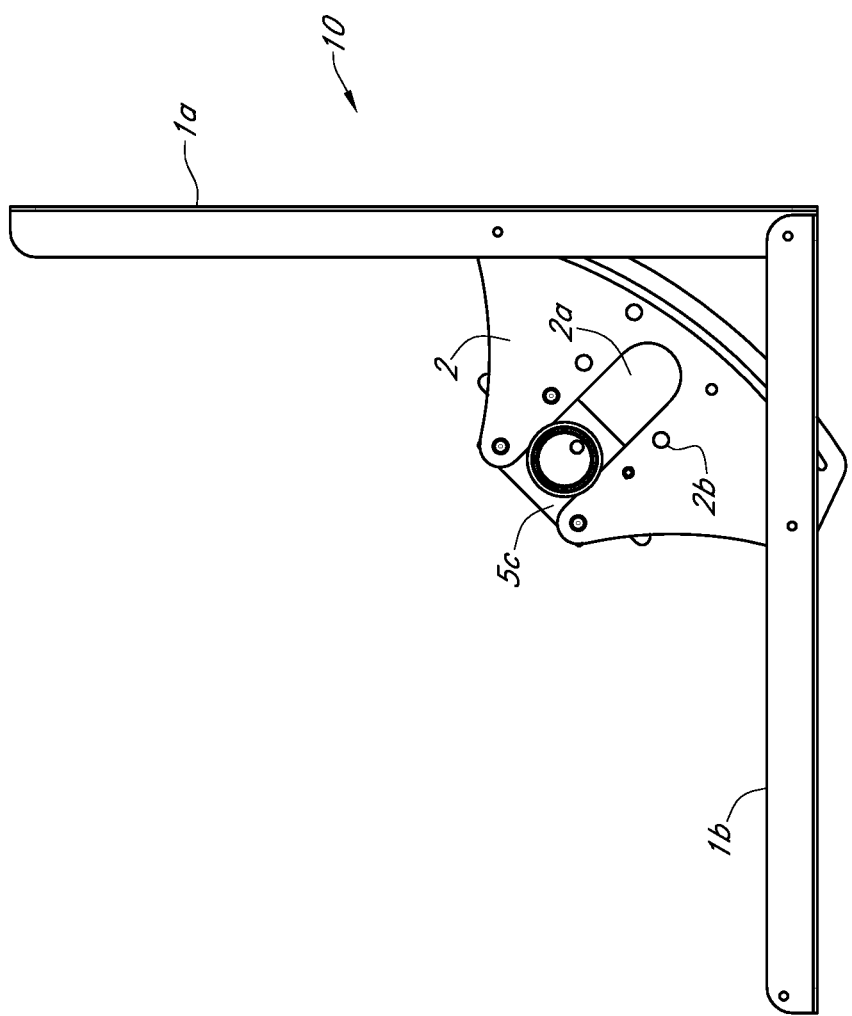
FIG. 1J is a bottom view of the camera mounting system as shown in FIG. 1B as shown herein.

FIG. 1F is another right perspective side view (top view) of the camera mounting system 10 as shown in FIG. 1D. FIG. 1G is a left side view of the camera mounting system 10 as shown in FIG. 1C as shown herein. FIG. 1H is a right-side view of the camera mounting system 10 as shown in FIG. 1D as shown herein. FIG. 1I is a top view of the camera mounting system 10 as shown in FIG. 1A as shown herein. FIG. 1J is a bottom view of the camera mounting system 10 as shown in FIG. 1B as shown herein.

Figure 2:
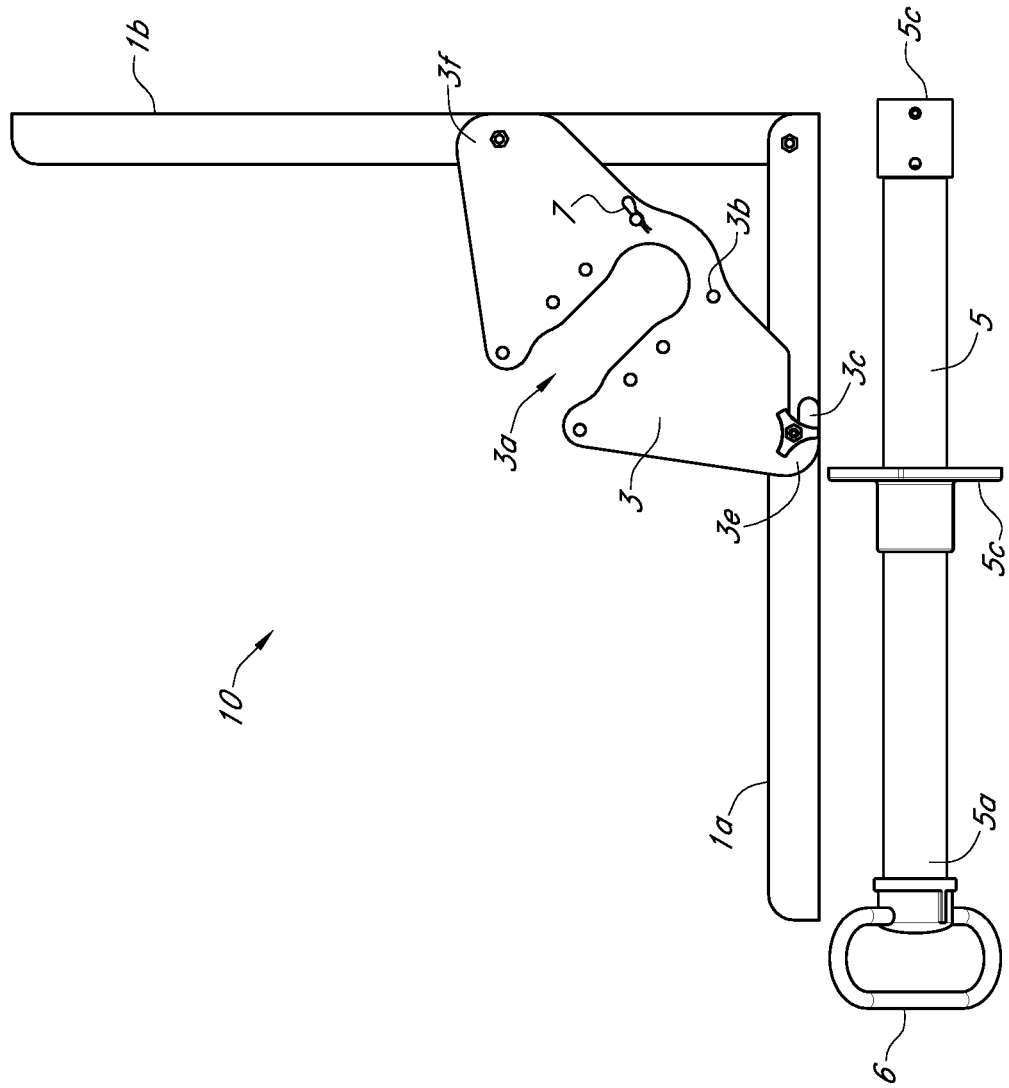
FIG. 2 is a perspective view of the camera mounting system with a mount cross brace with a side hook and a camera tube as shown herein.
Figure 2A:
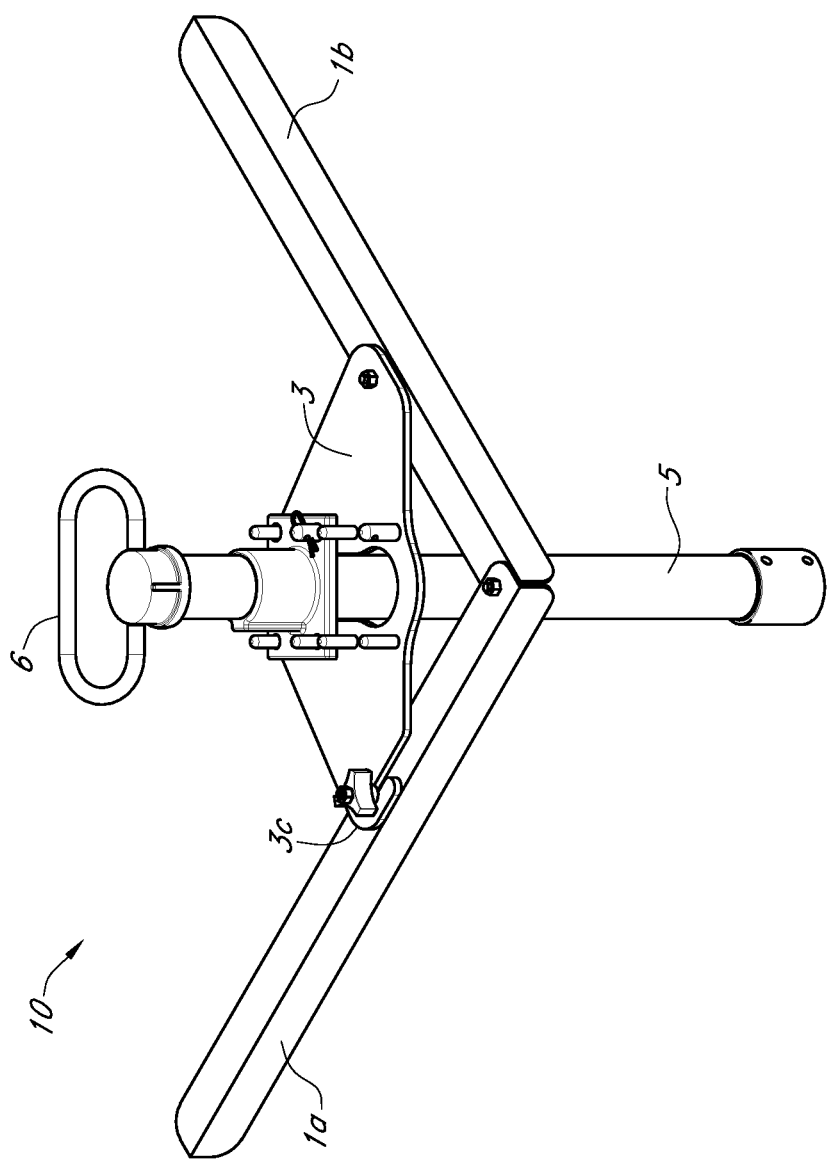
FIG. 2A is a top perspective view of another embodiment of the camera mounting system with a mount cross brace with a side hook as shown and disclosed herein.
Figure 2B:
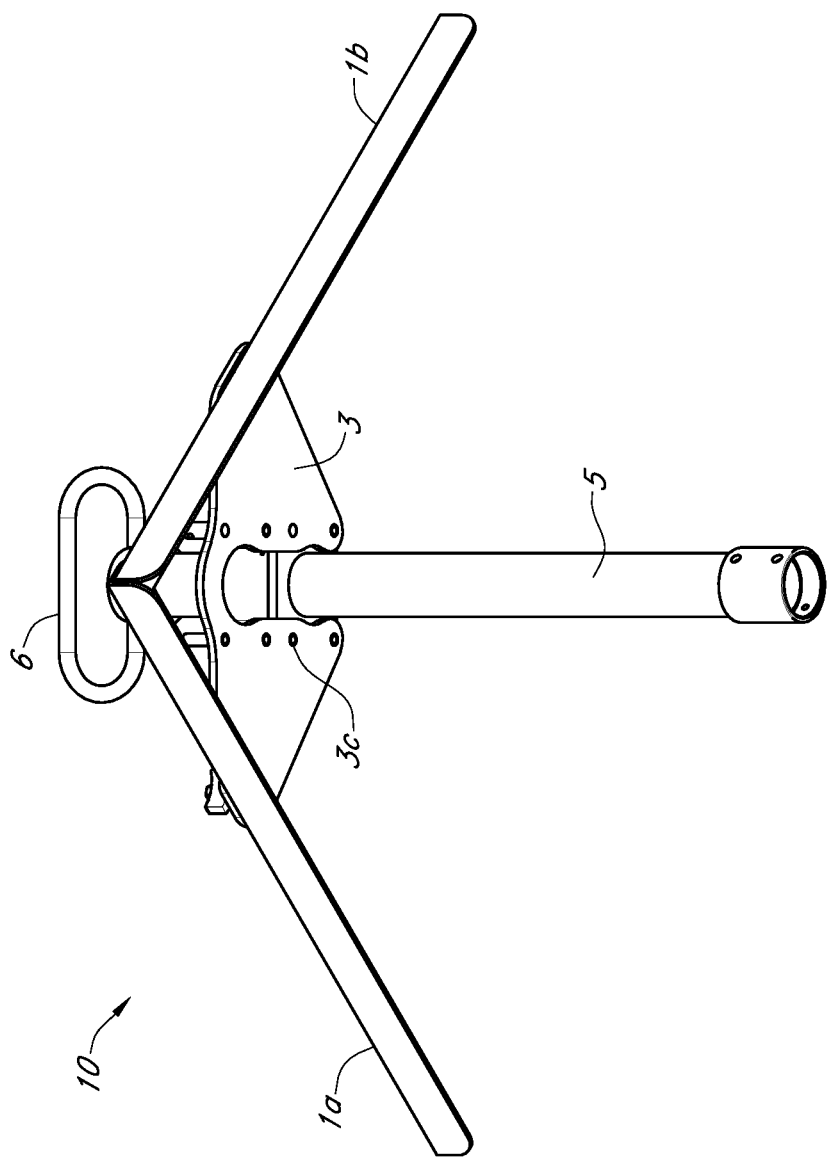
FIG. 2B is a bottom perspective view of the camera mounting system as shown in FIG. 2A herein.
Figure 2C:
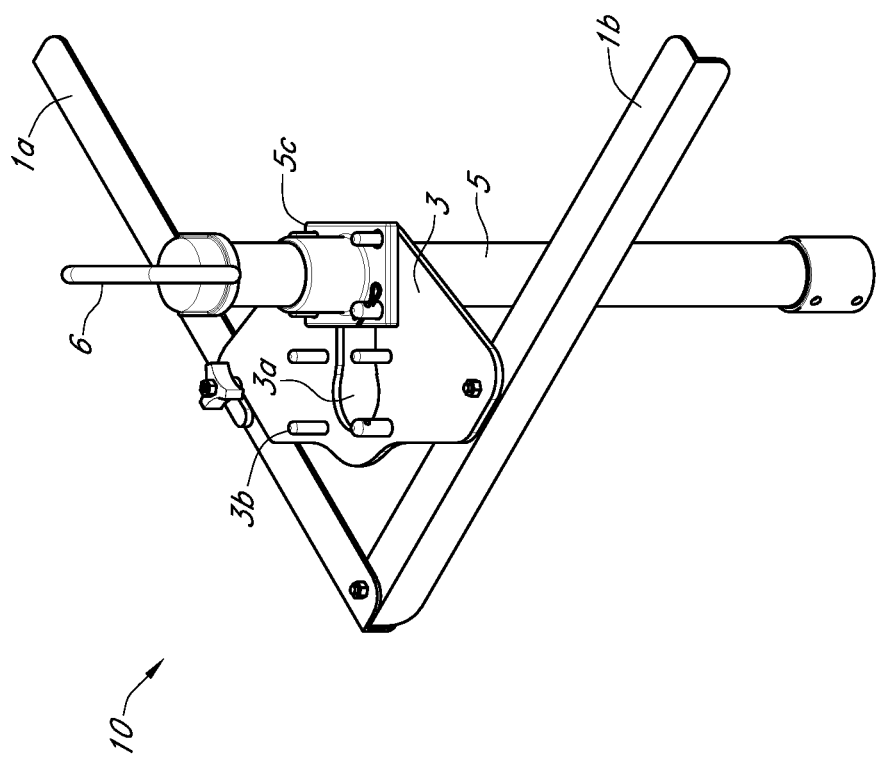
FIG. 2C is a left perspective side view of the camera mounting system as shown and disclosed herein.
Figure 2D:
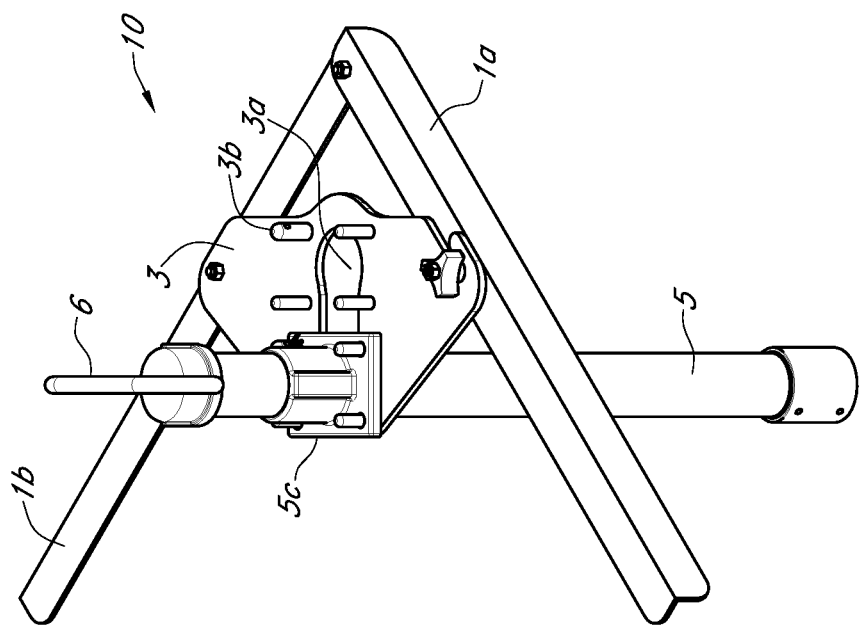
FIG. 2D is a right perspective side view of the camera mounting system as shown and disclosed herein.
Figure 2E:
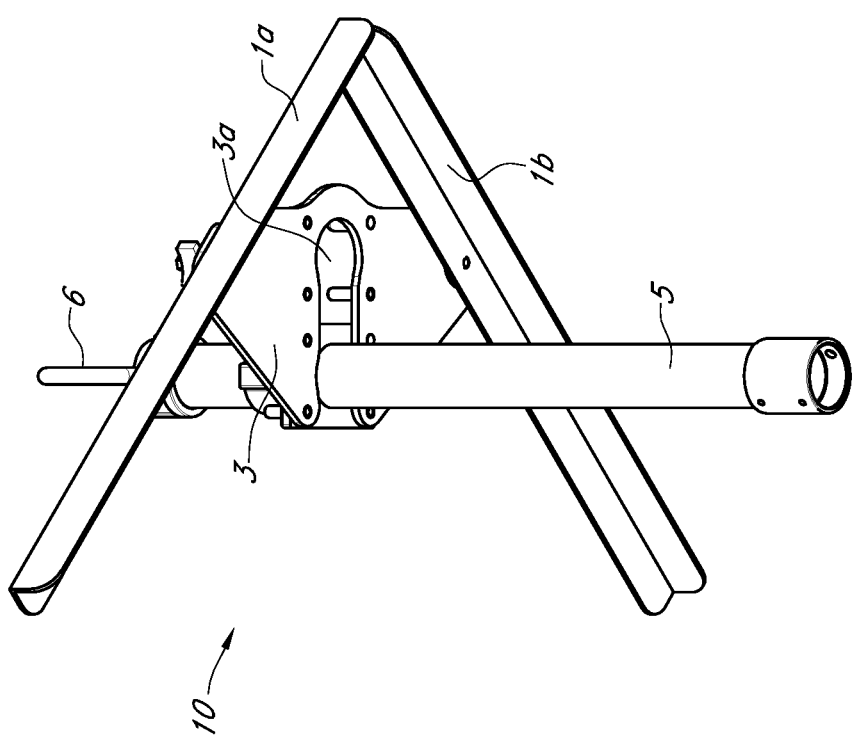
FIG. 2E is another left perspective side view (bottom view) of the camera mounting system as shown in FIG. 2C.
Figure 2F:
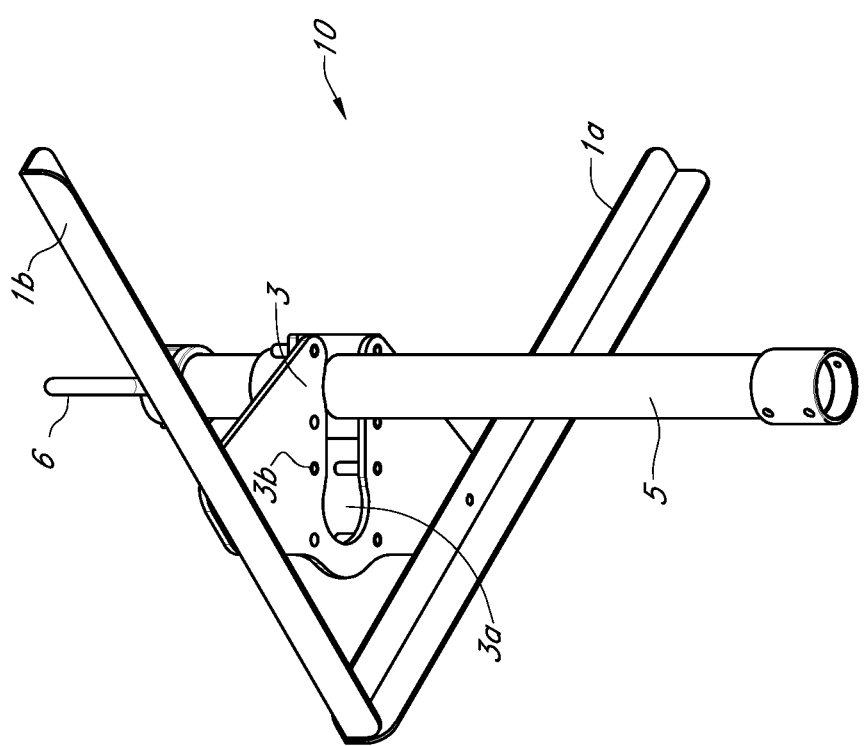
FIG. 2F is another right perspective side view (top view) of the camera mounting system as shown in FIG. 2D.
Figure 2G:
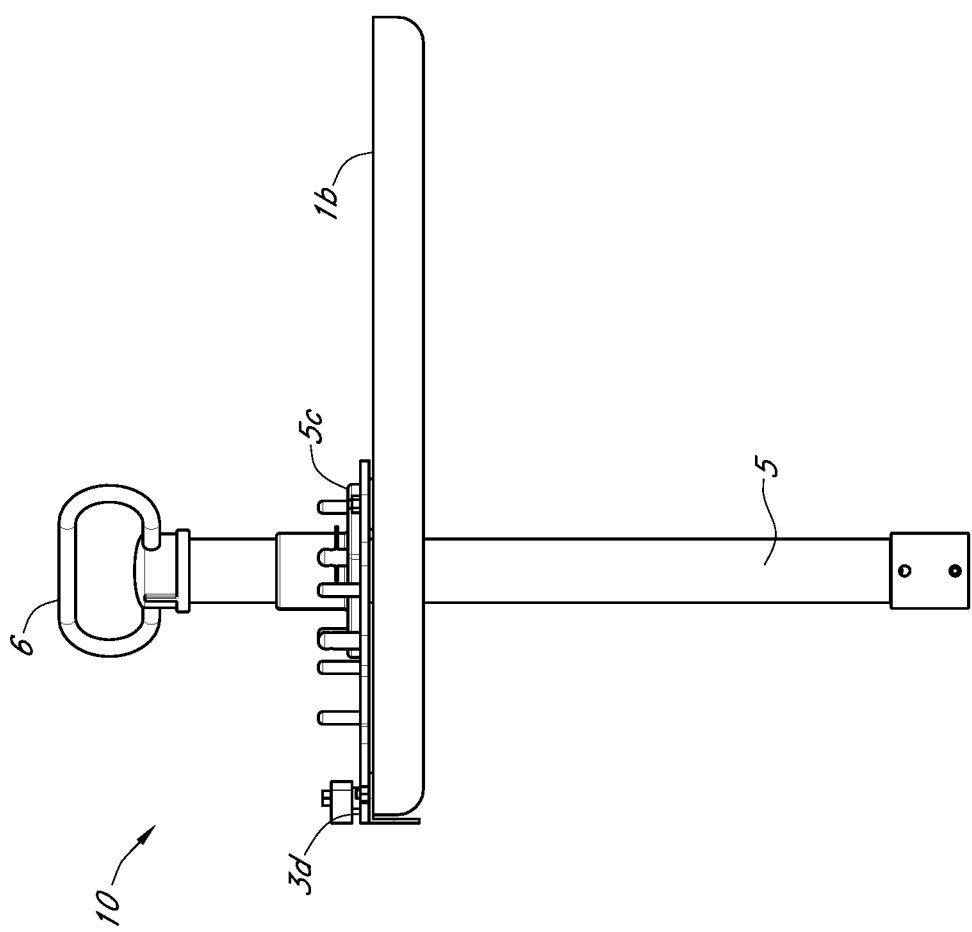
FIG. 2G is a left side view of the camera mounting system as shown in FIG. 2C as shown herein.
Figure 2H:
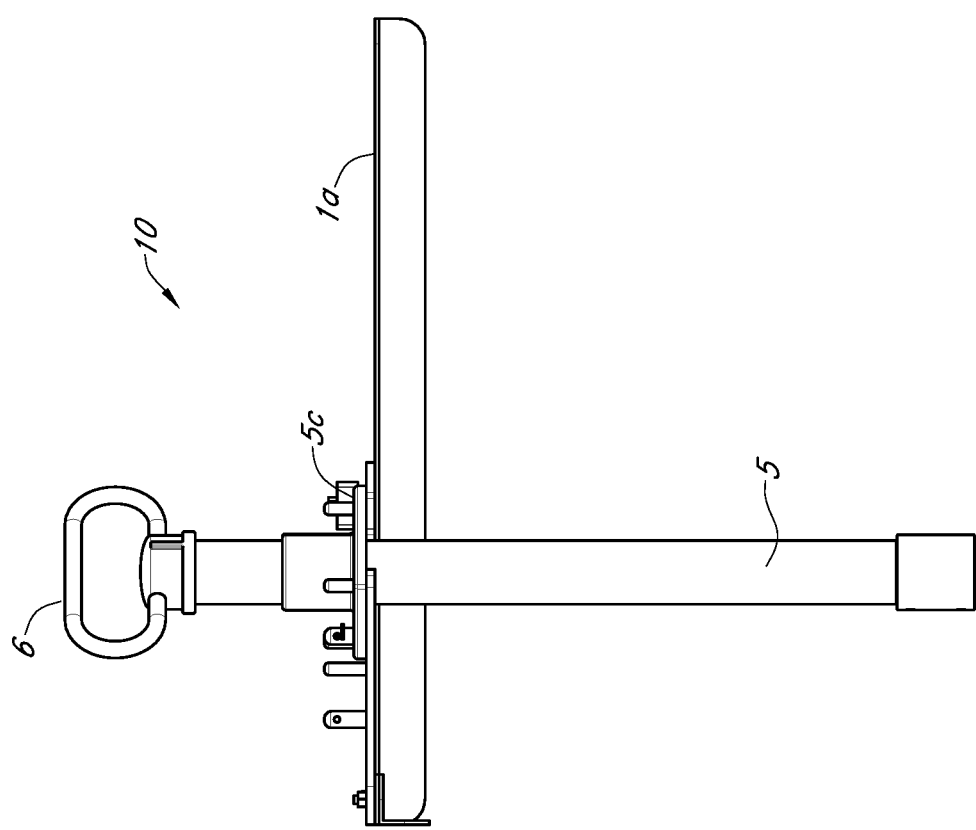
FIG. 2H is a right-side view of the camera mounting system as shown in FIG. 2D as shown herein.
Figure 2I:
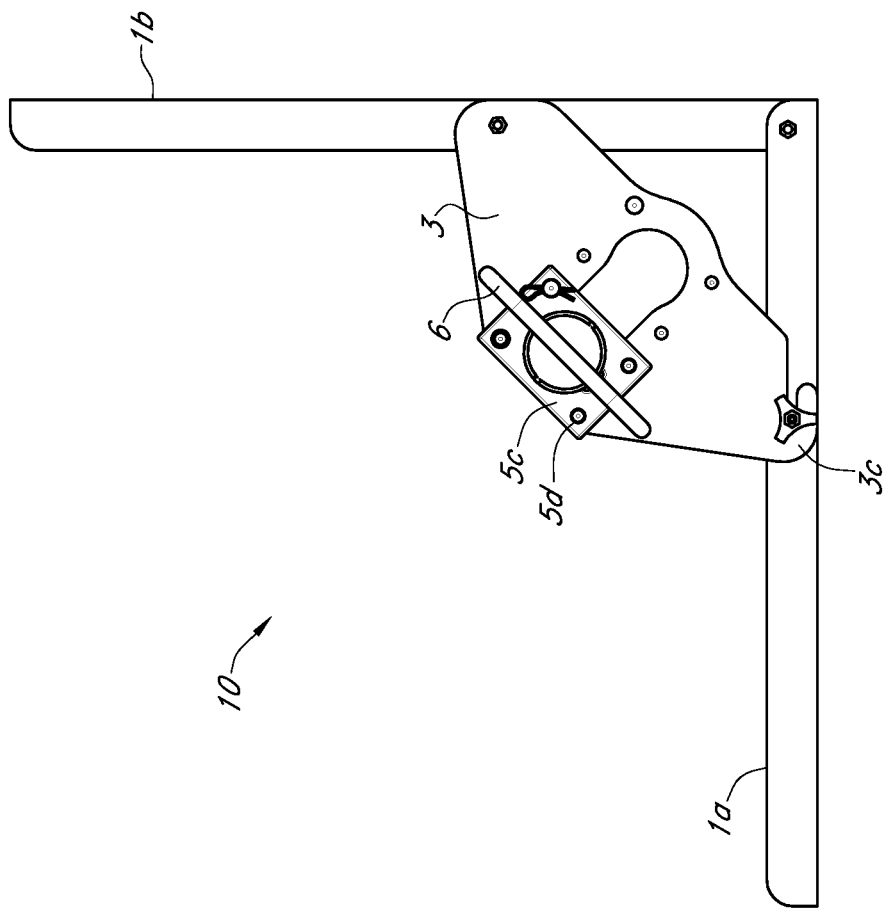
FIG. 2I is a top view of the camera mounting system as shown in FIG. 2A as shown herein.

FIG. 2 is a perspective view of the camera mounting system with a mount cross brace with a side hook 3 and a camera tube 5 as shown herein. FIG. 2A is a top perspective view of the camera mounting system with a mount cross brace with a side hook 3 as shown and disclosed herein. FIG. 2B is a bottom perspective view of the camera mounting system 10 as shown in FIG. 2A herein. FIG. 2C is a left perspective side view of the camera mounting system as shown and disclosed herein. FIG. 2D is a right perspective side view of the camera mounting system 10 as shown and disclosed herein. FIG. 2E is another left perspective side view (bottom view) of the camera mounting system 10 as shown in FIG. 2C. FIG. 2F is another right perspective side view (top view) of the camera mounting system 10 as shown in FIG. 2D. FIG. 2G is a left side view of the camera mounting system 10 as shown in FIG. 2C as shown herein. FIG. 2H is a right-side view of the camera mounting system 10 as shown in FIG. 2D as shown herein. FIG. 2I is a top view of the camera mounting system 10 as shown in FIG. 2A as shown herein.

Figure 3A:
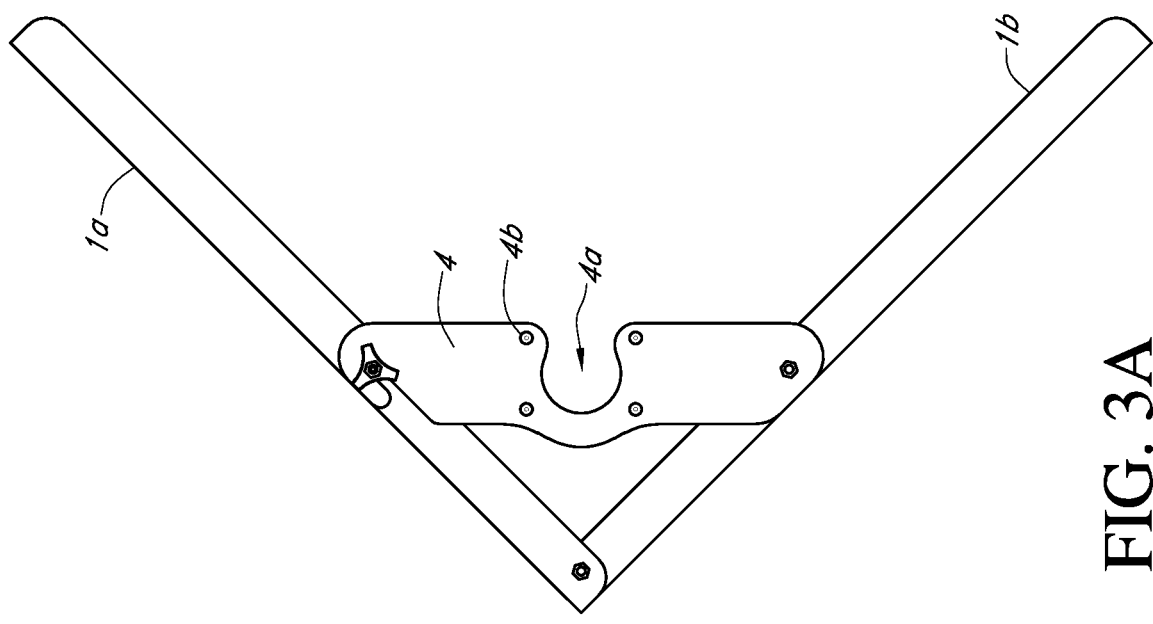
FIG. 3A is a top view of another embodiment of the camera mounting system with a fixed mount cross brace as shown and disclosed herein.
Figure 3B:
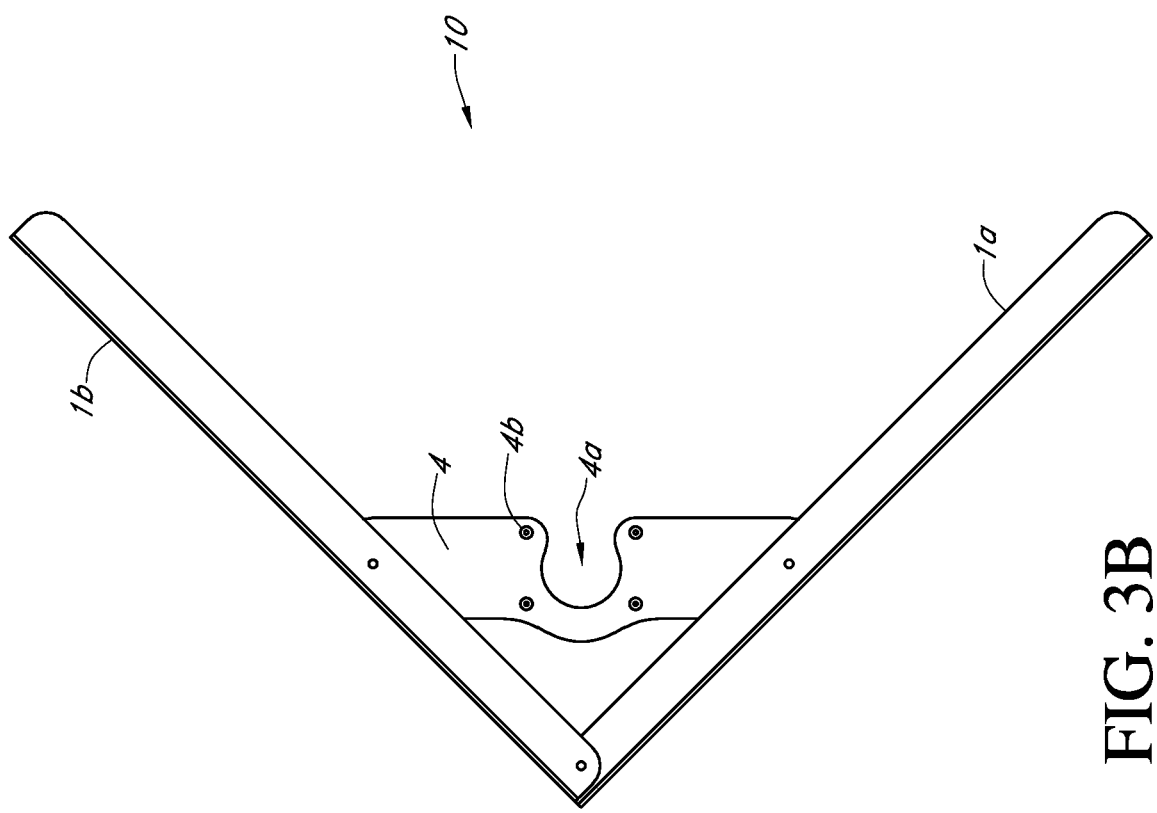
FIG. 3B is a bottom view of the camera mounting system with a fixed mount cross brace as shown and disclosed herein.

FIG. 3A is a top view of the camera mounting system 10 with a fixed mount cross brace 4 as shown and disclosed herein. FIG. 3B is a bottom view of the camera mounting system 10 with a fixed mount cross brace 4 as shown and disclosed herein.

Figure 2J:
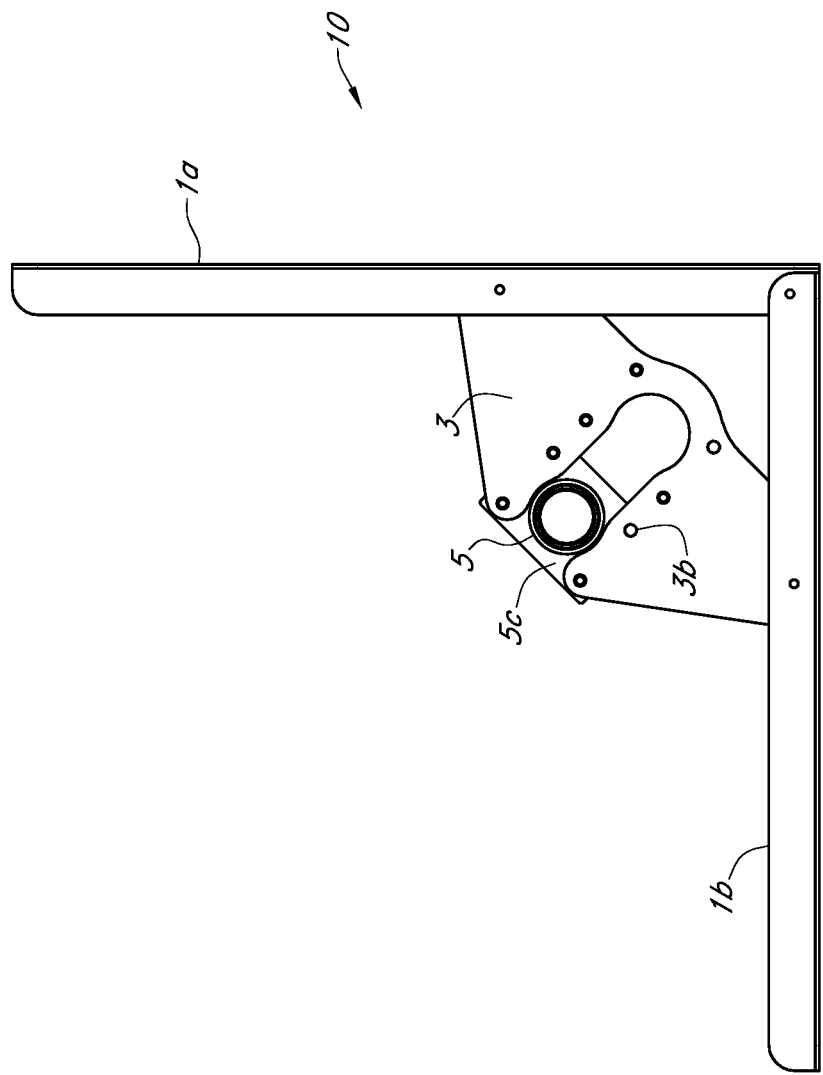
FIG. 2J is an underside view of the camera mounting system as shown in FIG. 2A as shown herein.
Figure 4C:
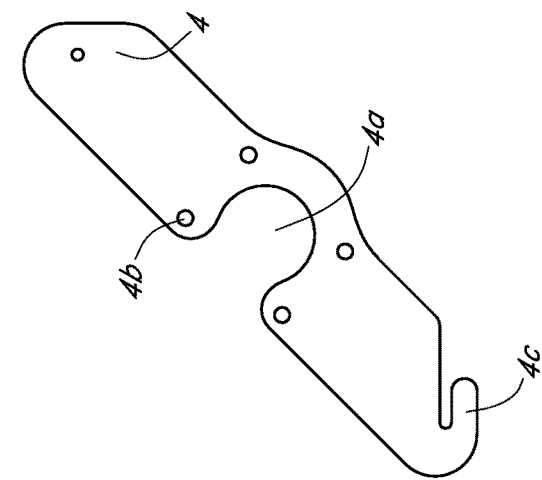
FIG. 4C is a top view of the fixed mount cross brace as shown in FIGS. 3A-3B.
Figure 4B:
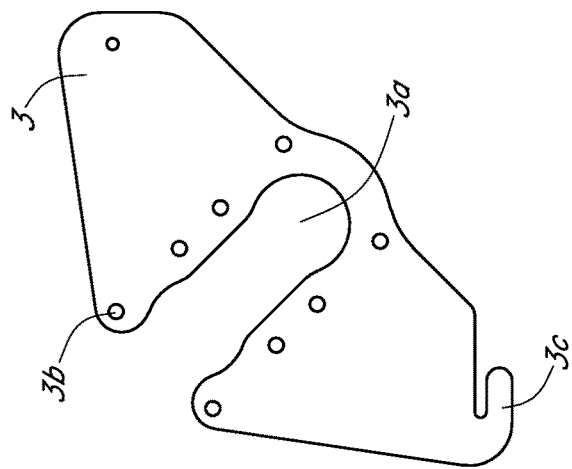
FIG. 4B is a top view of the mount cross brace having a side hook as shown in FIGS. 2-2J.
Figure 4A:
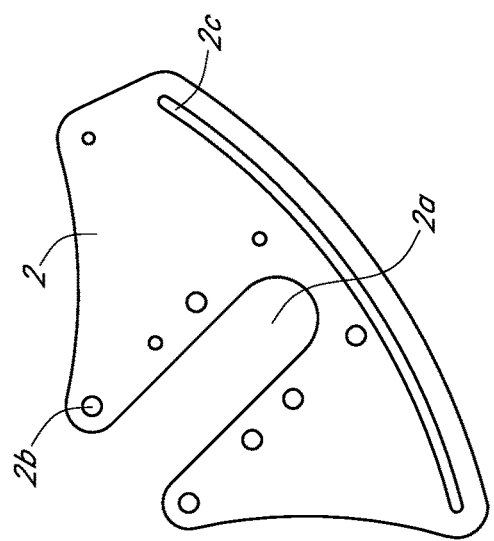
FIG. 4A is a top view of the mount cross brace having a slot as shown in FIG. 1A-1J.

FIG. 4A is a top view of the mount cross brace 2 having a slot 2c as shown in FIG. 1A-1J. FIG. 4B is a top view of the mount cross brace 3 having a side hook 3c as shown in FIGS. 2-2J. FIG. 4C is a top view of the fixed mount cross brace as shown in FIGS. 3A-3B. One of ordinary skill will appreciate that any one of the three embodiments of the mount cross brace shown in FIG. 1, 2, or 3 may be used to mount the camera 9 and to implement the barge compartment visual inspection method disclosed herein, subject to the particular advantages any one embodiment may have for a particular situation.

Figure 5:
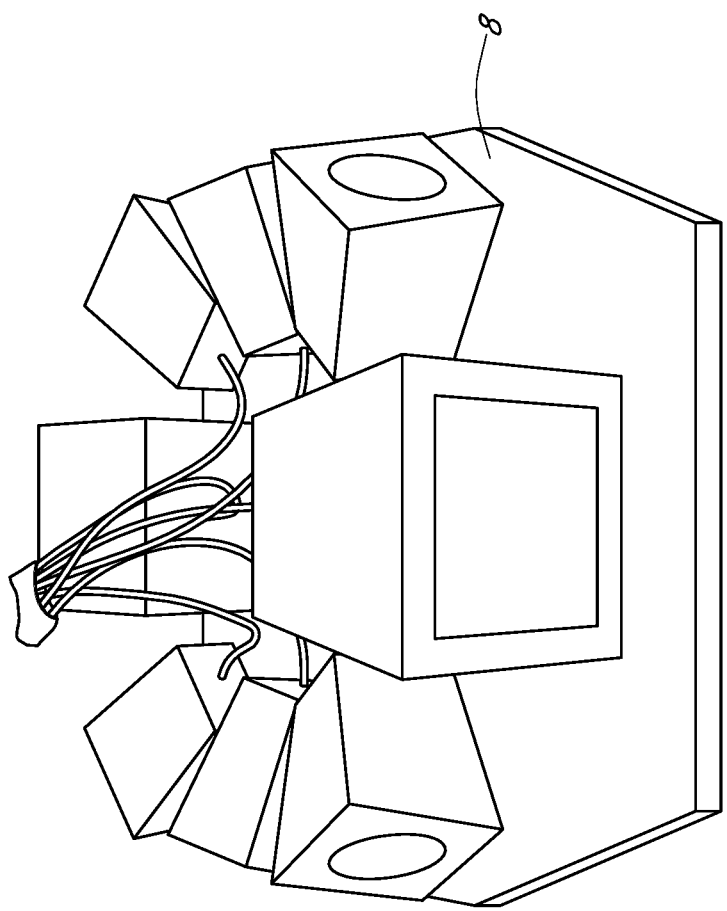
FIG. 5 is a perspective of the light positioned along the length of the camera tube as shown and disclosed herein.

FIG. 5 is a perspective of the light 8 positioned along the length of the camera tube 5 as shown and disclosed herein.

Figure 6A:
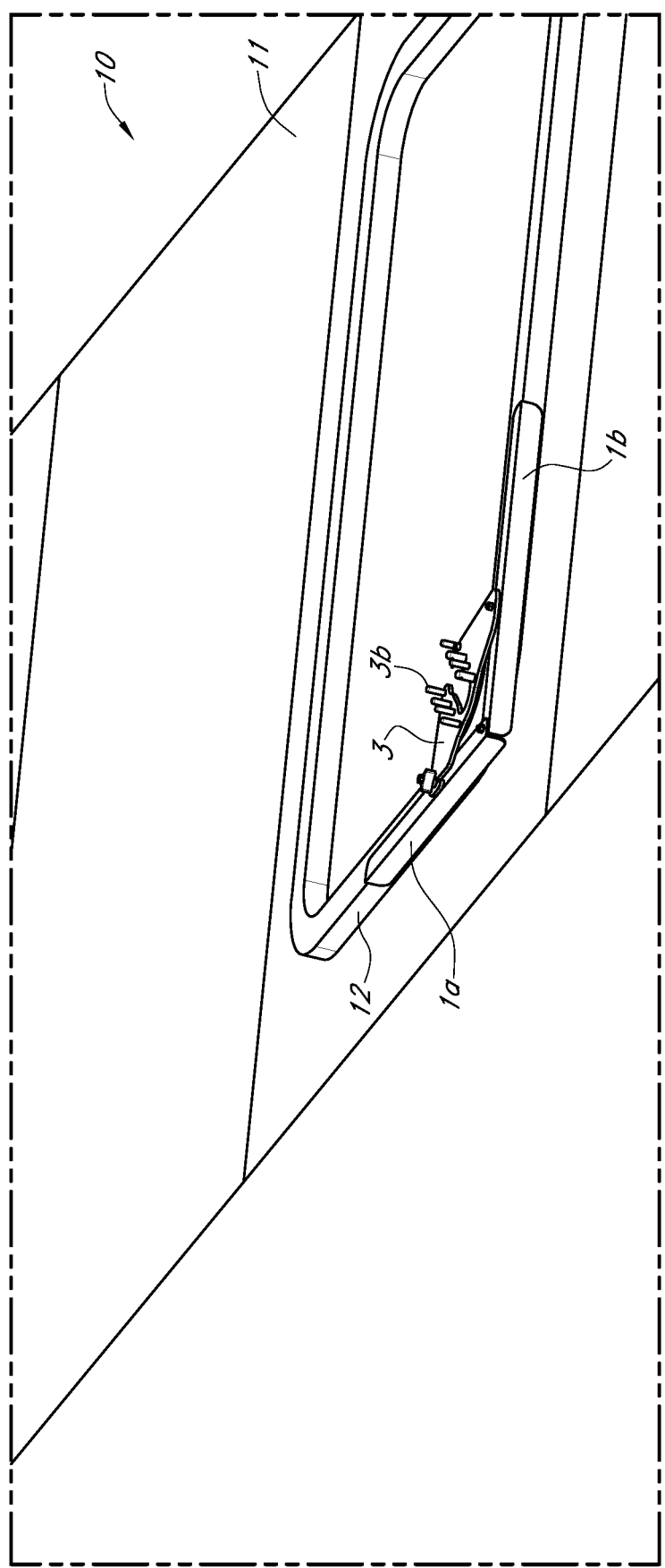
FIG. 6A is a perspective view of the mount cross brace with a side hook attached to the support frames wherein the support frames are positioned at a corner of a barge hatch (rectangular 90 degree) in a barge lid as shown herein.
Figure 6B:
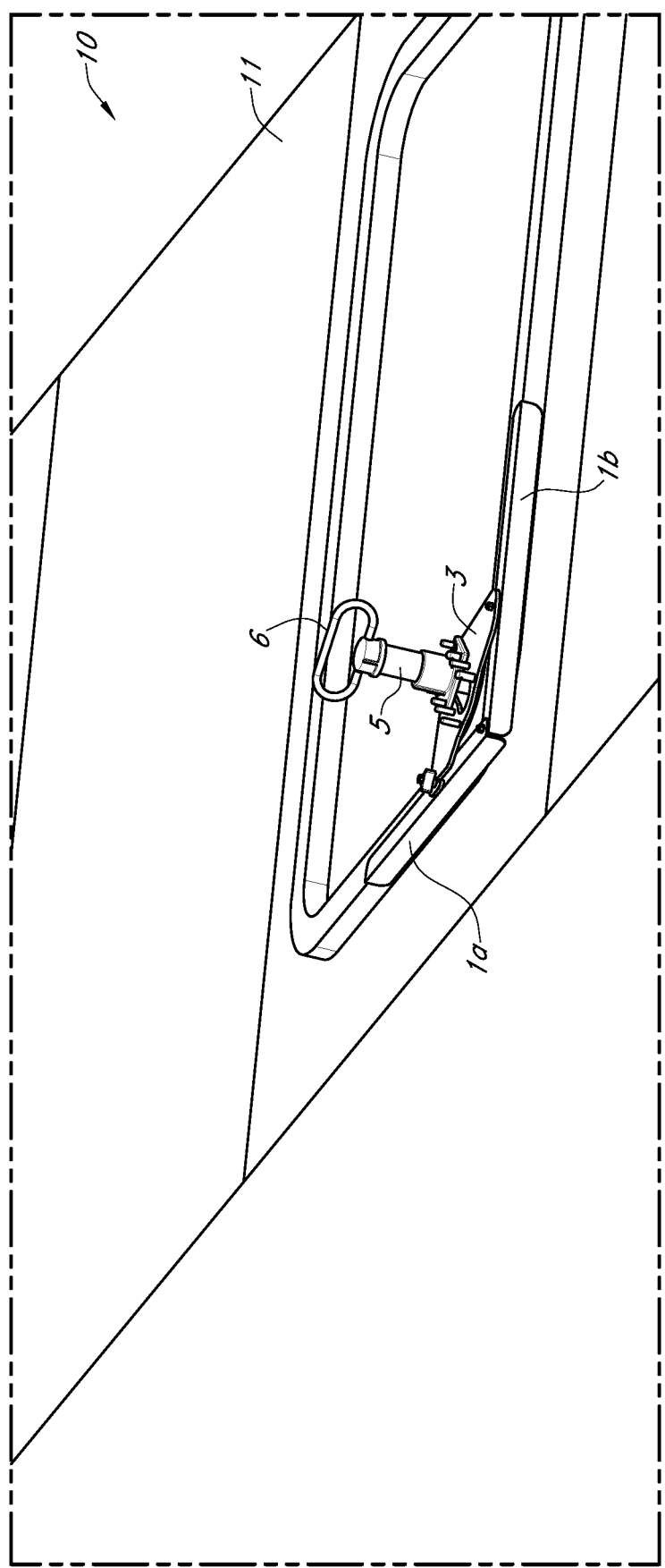
FIG. 6B is a perspective view of the mount cross brace with a side hook attached to the support frames wherein the support frames are positioned at a corner of a barge hatch (rectangular 90 degree) and a camera tube as shown herein.

FIG. 6A is a perspective view of the mount cross brace with a side hook attached to the support frames wherein the support frames positions at a corner of a barge hatch (rectangular 90 degree) in a barge lid 11 as shown herein. FIG. 6B is a perspective view of the mount cross brace with a side hook attached to the support frames (1a and 1b) wherein the support frames 1 are positioned at a corner of a barge hatch (rectangular 90 degree) and a camera tube 5 as shown herein.

Figure 7A:
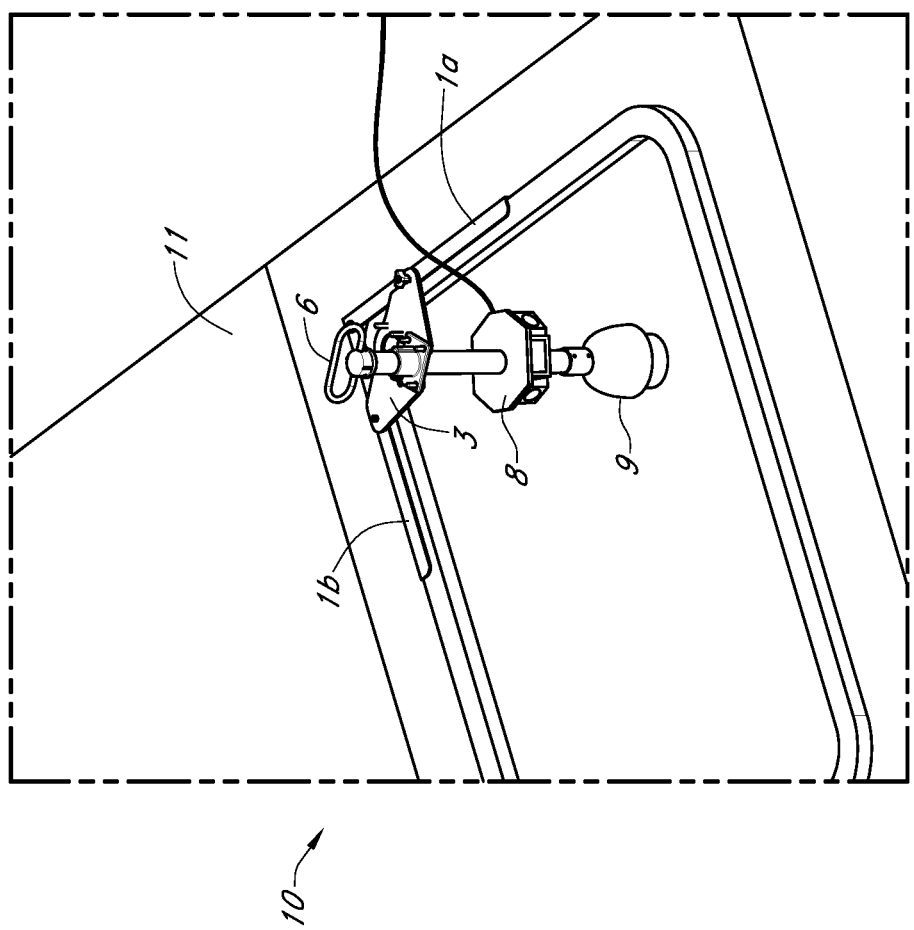
FIG. 7A is a perspective view of the camera mounting system with a mount cross brace with a side hook and a light attached for inspection during the daytime as shown herein.
Figure 7B:
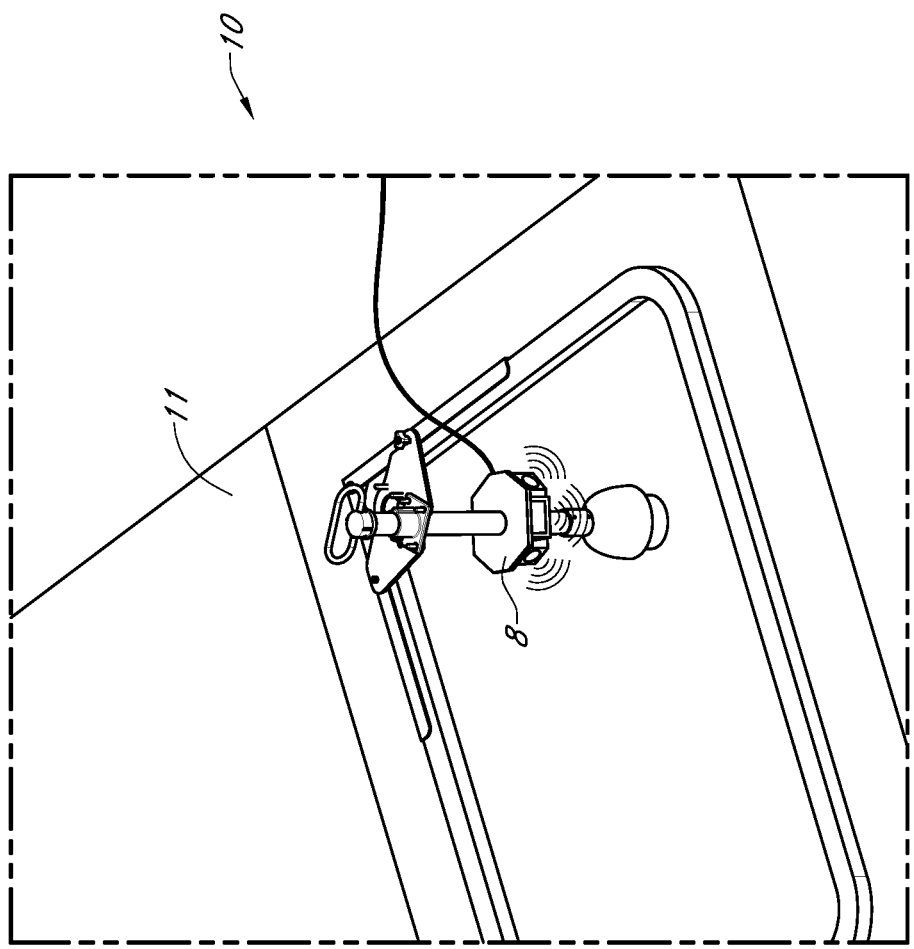
FIG. 7B is a perspective view of the camera mounting system with a mount cross brace with a side hook and a light attached for inspection during the nighttime as shown herein.

FIG. 7A is a perspective view of the camera mounting system 10 with a mount cross brace with a side hook and a light 8 attached for inspection of the visual interior of a barge compartment as shown herein. FIG. 7B is a perspective view of the camera mounting system 10 with a mount cross brace with a side hook and a light attached for inspection during the nighttime as shown herein.

Figure 8A:
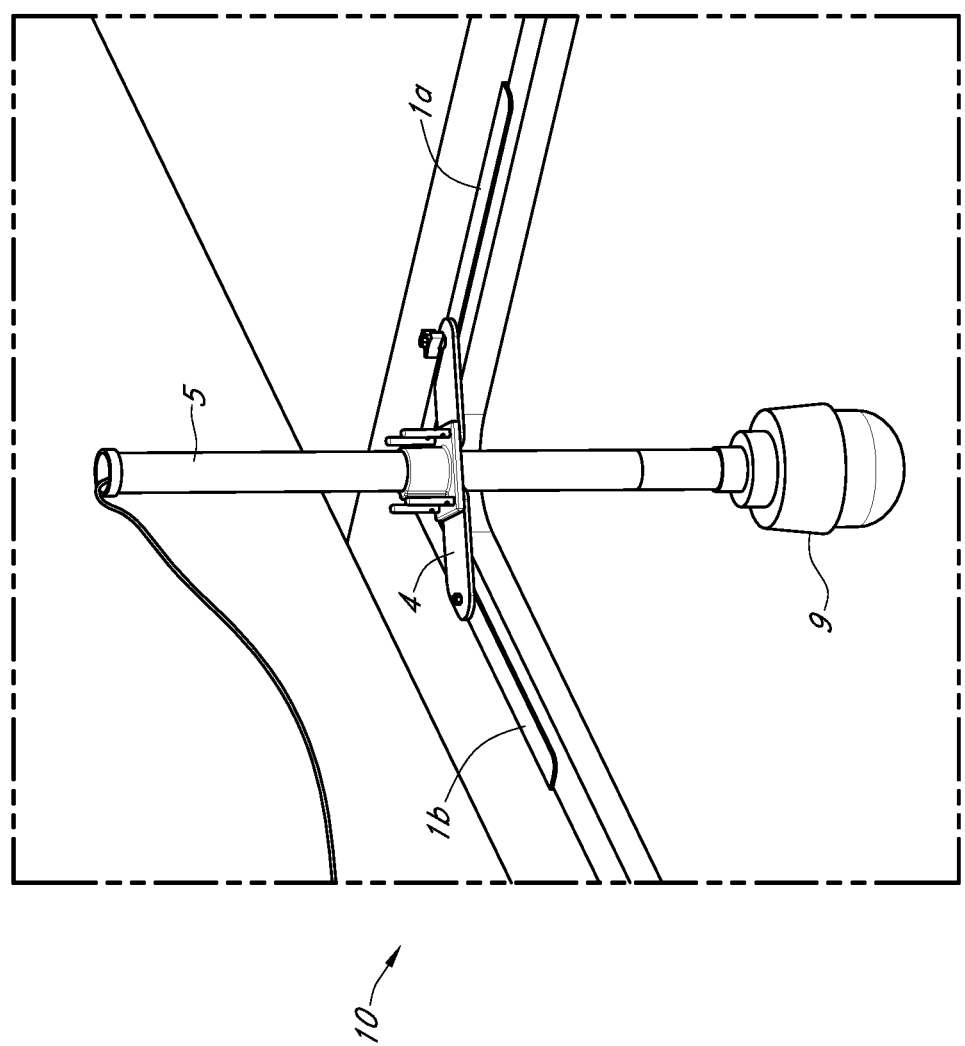
FIG. 8A is a front perspective view of the camera mounting system with a fixed mount cross brace attached to the support frames wherein the support frames are positioned at a corner of a barge hatch (round 90 degree) as shown herein.
Figure 8B:
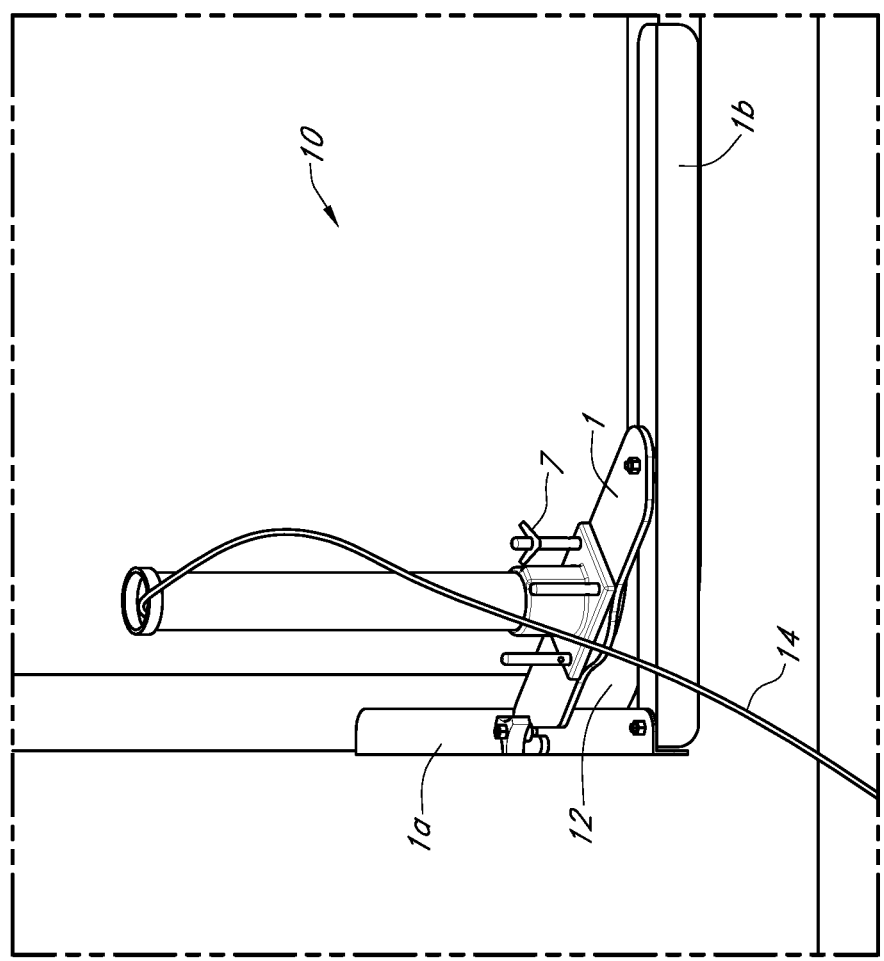
FIG. 8B is a rear perspective view of the camera mounting system with a fixed mount cross brace attached to the support frames wherein the support frames are positioned at a corner of a barge hatch (round 90 degree) as shown herein.

FIG. 8A is a front perspective view of the camera mounting system with a fixed mount cross brace attached to the support frames wherein the support frames are positioned at a corner of a barge hatch (round 90 degree) as shown herein. FIG. 8B is a rear perspective view of the camera mounting system with a fixed mount cross brace attached to the support frames wherein the support frames are positioned at a corner of a barge hatch (round 90 degree) as shown herein.

The camera mounting system 10 for inspection as disclosed herein and enabled by FIGS. 1-9 is intended to be used with at least one light 8 and a camera 9 connected to a data transmission system, not shown but well known to one of ordinary skill in the art and may include without limitation wifi or a data transmission cable (i.e. CAT 5) to allow temporary installation of the mounting system upon a barge hatch 12 to allow for visual confirmation via a camera 9 or other digital imaging system of the interior space of the barge compartment 11. See also Appendix A: ILLUSTRATIVE OPERATION AND USE.

Figure 9A:
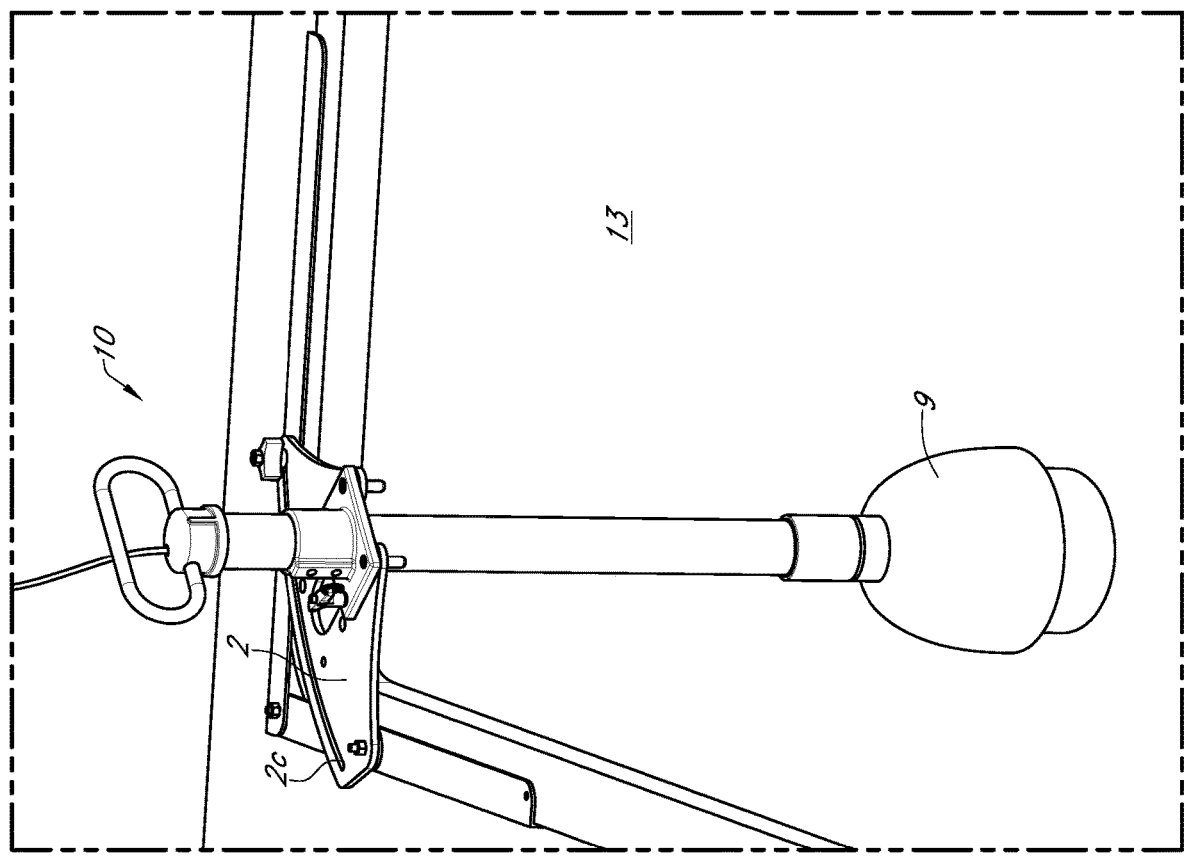
FIG. 9A is a front perspective view of the camera mounting system with a mount cross brace having a slot therein with the camera positioned in the barge hold.

FIG. 9A is a front perspective view of the camera mounting system 10 with a mount cross brace 2 having a slot 2c therein with the camera 9 positioned in the barge hold 13.

Figure 9B:
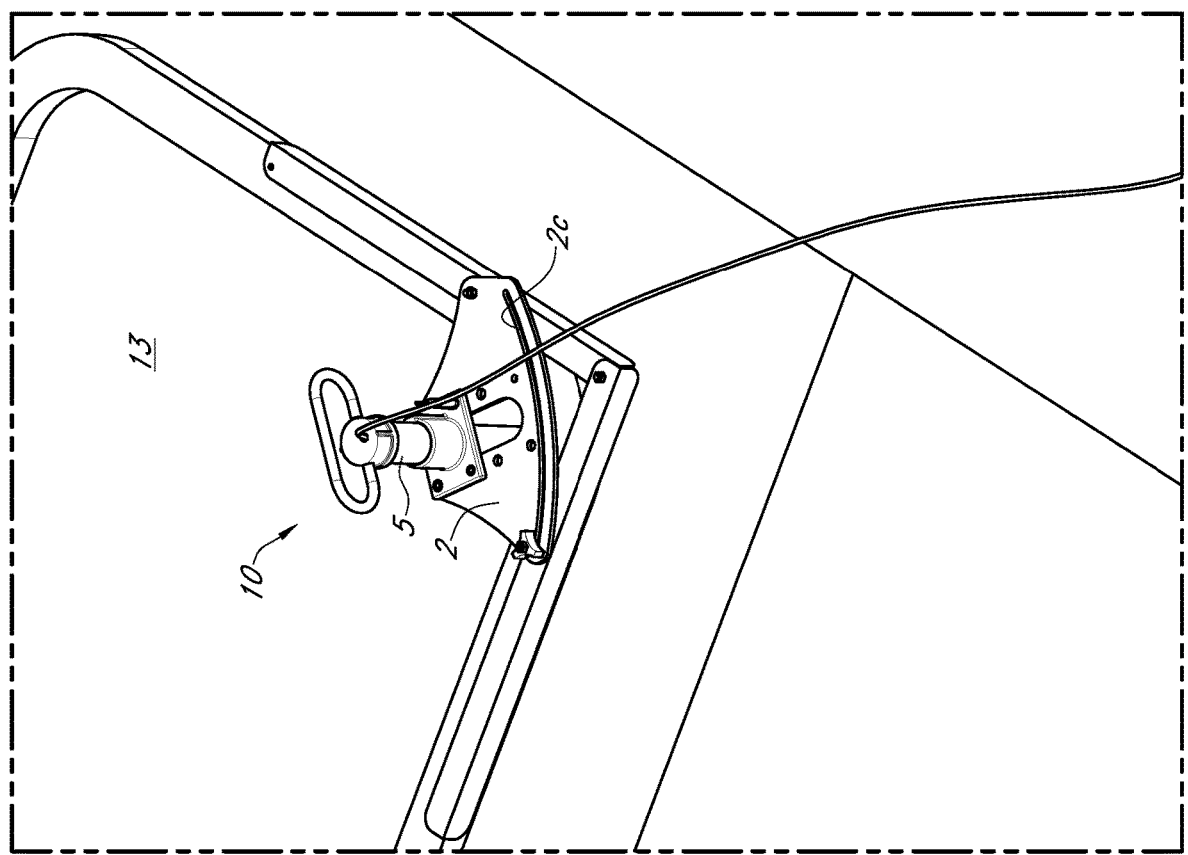
FIG. 9B is a top perspective view of the camera mounting system with a mount cross brace having a slot therein with the camera positioned in the barge hold.

FIG. 9B is a top perspective view of the camera mounting system 10 with a mount cross brace 2 having a slot 2c therein with the camera 5 positioned in the barge hold 13.

Figure 9C:
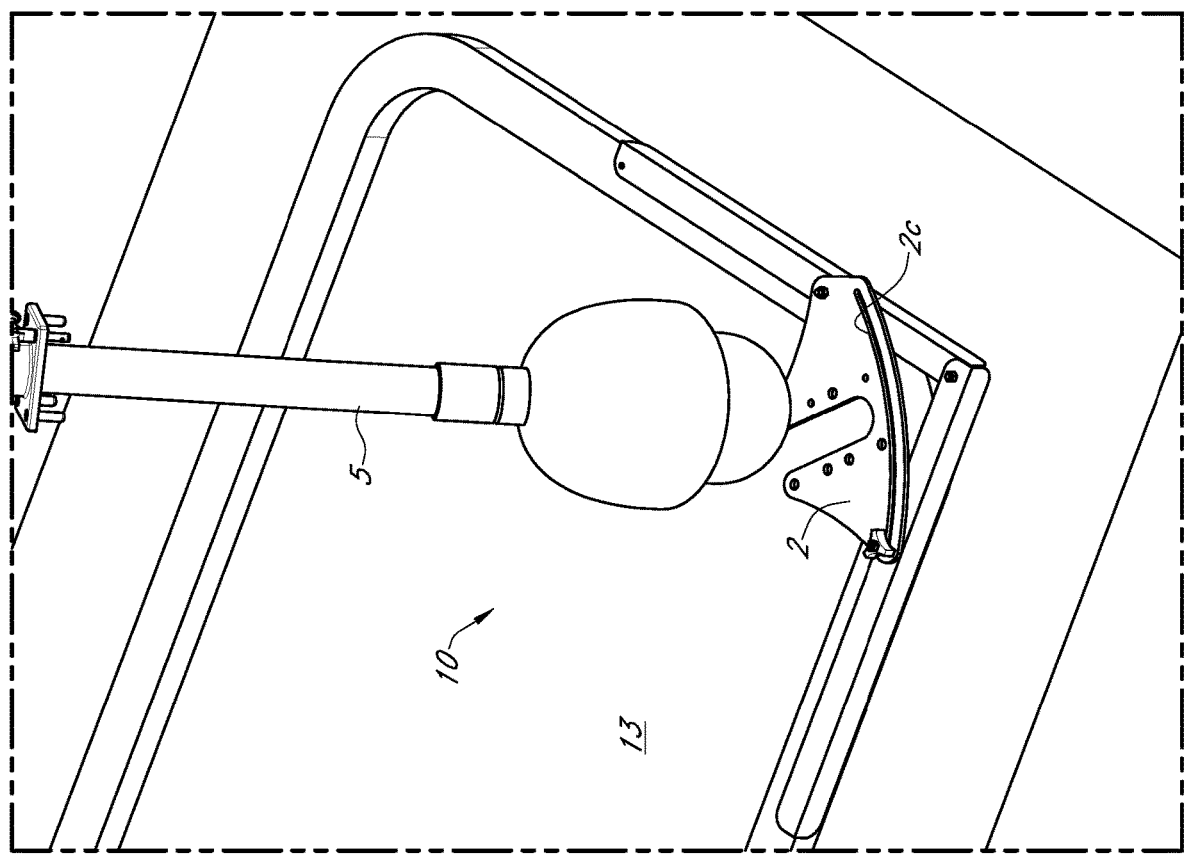
FIG. 9C is a rear perspective view of the camera mounting system with the mount cross brace having a slot therein prior to installation of the camera into the barge hold.

FIG. 9C is a rear perspective view of the camera mounting system with the mount cross brace 2 having a slot 2c therein prior to installation of the camera 5 into the barge hold 13.

The camera mounting system 10 is intended to be used to reduce personnel exposure to the interior of barges (barge hold 13). In another aspect of the camera mounting system 10, it is portable and may be folded. In another aspect, the camera mounting system 10 allows use with hatches 11 generally rectangular at the access hatch as well as hatches having rounded or sweeping ninety type access hatches with the mounting system 10 providing multiple positions for placement of the camera for either hatch type to ensure repeatability of the visual confirmation between various barge hold designs and barge configurations.

One of ordinary skill will appreciate that depending on the materials selected, the camera tube and the handle can be constructed together or constructed separately and conventionally attached together. As illustrated the attachment configuration does not require complex manufacturing; therefore, the production of the device would be relatively economical and low maintenance cost.

While certain specific embodiments have been described in detail, it is understood that the present disclosure will be appreciated by those skilled in the art and will be developed considering the overall teaching of the disclosure. Accordingly, the embodiments disclosed herein should not be construed as limitation on the scope of the invention, but should be determined by the appended claims and their legal equivalents.

As one of ordinary skill will appreciate the present disclosure is not limited by the means of construction or the materials chosen as other suitable materials, including plastic, steel or aluminum, and combinations therein.

It should be noted that particular embodiment are not limited to the specific embodiments pictured and described herein, but is intended to apply to all similar apparatuses and methods for providing the various benefits of those elements, which such benefits are explicitly and/or inherently disclosed herein. Modifications and alterations from the described embodiments will occur to those skilled in the art without departure from the spirit and scope of the camera mounting system for inspection. Furthermore, variations and modifications of the foregoing are within the scope of the camera mounting system for inspection. It is understood that the camera mounting system for inspection as disclosed herein extends to all alternative combinations of one or more of the individual features mentioned, evident from the text and/or drawings, and/or inherently disclosed. All of these different combinations constitute various alternative aspects of the coated vibration reduction wrench. The embodiments described herein explain the best modes known for practicing the camera mounting system for inspection and will enable others skilled in the art to utilize the same. The claims are to be construed to include alternative embodiments to the extent permitted by the prior art.

Having described preferred aspects of the various methods and apparatuses, other features of the present disclosure will undoubtedly occur to those versed in the art, as will numerous modifications and alterations in the embodiments as illustrated herein, all of which may be achieved without departing from the spirit and scope of the present disclosure. Accordingly, the methods and embodiments pictured and described herein are for illustrative purposes only, and the scope of the present disclosure extends to all method and/or structures for providing the various benefits and/or features of the present disclosure and/or components thereof unless so indicated in the following claims. Furthermore, the methods and embodiments pictured and described herein are no way limiting to the scope of the present disclosure unless so stated in the following claims.

Any dimensions provided herein are for illustrative purposes only and in no way limit the scope of the present disclosure unless so indicated in the following claims. It should be noted that the present disclosure and/or components thereof are not limited to the specific embodiments pictured and described herein, but are intended to apply to all similar apparatuses and methods for providing a predictive design analysis in a virtual environment. Modifications and alterations from the described embodiments will occur to those skilled in the art without departure from the spirit and scope of the present disclosure.

Any of the various features, components, functionalities, advantages, aspects, configurations, etc. for the present disclosure may be used alone or in combination with one another depending on the compatibility of the features. Accordingly, a nearly infinite number of variations of the present disclosure exists. Modifications and/or substitutions of one feature, component, functionality, aspect, configuration, etc. for another in no way limit the scope of the present disclosure unless so indicated in the following claims.

It is understood that the present disclosure extends to all alternative combinations of one or more of the individual features mentioned, evident from the text and/or drawings, and/or inherently disclosed. All of these different combinations constitute various alternative aspects of the present disclosure and/or components thereof. The embodiments described herein explain the best modes known for practicing the apparatuses, methods, and/or components disclosed herein and will enable others skilled in the art to utilize the same. The claims are to be construed to include alternative embodiments to the extent permitted by the prior art.

While the present disclosure has been described in connection with preferred aspects and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including but not limited to: matters of logic with respect to arrangement of steps or operational flow; plain meaning derived from grammatical organization or punctuation; the number or type of embodiments described in the specification.

The invention claimed is:

1. A camera mounting system for inspection of a barge hold comprising:
    a) a support frame, the support frame further comprised of:
        (i) a first support frame having a first end and a second end;
        (ii) a second support frame having a first end and a second end, wherein the second end of the first support is connected to the second end of the second support frame,
    b) a mount cross brace, the mount cross brace further comprised of:
        (i) a body having a generally triangular shape with a first support surface and a second support surface positioned across the body, wherein the first support surface rests upon the first support frame and the second support surface rests upon the second support frame;
        (ii) an opening formed in the body having a perimeter and creating a u-shaped void proximate the center of the body, wherein a plurality of holes are positioned around the perimeter of the opening;
    c) a mounting plate configured to fit upon the opening and having an aperture positioned therein; and,
    d) a camera tube, the camera tube configured to connect an upper end and a lower end, wherein the camera tube is positioned in the mounting plate aperture and the lower end is configured to engage with a camera.

2. The camera mounting system for inspection of a barge according to claim 1 wherein the mounting plate is configured with a set of pin holes which engage with the plurality of holes positioned around the perimeter of the opening allowing the position of the mounting plate on the mount cross brace to be adjusted.

3. The camera mounting system for inspection of a barge according to claim 1 wherein the mounting plate is configured with a set of pin holes which engage with a plurality of rods positioned around the perimeter of the opening allowing the position of the mounting plate on the mount cross brace to be adjusted.

4. The camera mounting system for inspection of a barge according to claim 1 wherein the mounting plate is configured with a set of pin holes which engage with a plurality of rods positioned around the perimeter of the opening allowing the position of the mounting plate on the mount cross brace to be adjusted.

5. The camera mounting system for inspection of a barge according to claim 1 wherein the body of the mount cross brace has a slot positioned proximate the opening, the slot allowing adjustment of the first support in relation to the second support.

6. The camera mounting system for inspection of a barge according to claim 5 wherein the body of the mount cross brace has an anterior side facing the first support and the second support, wherein the slot is positioned between the opening and the anterior side, the slot allowing adjustment of the first support in relation to the second support.

7. The camera mounting system for inspection of a barge according to claim 6 wherein the slot is curved.

8. The camera mounting system for inspection of a barge according to claim 5 wherein the mounting plate is configured with a set of pin holes which engage with the plurality of holes positioned around the perimeter of the opening allowing the position of the mounting plate on the mount cross brace to be adjusted.

9. The camera mounting system for inspection of a barge according to claim 6 wherein the mounting plate is configured with a set of pin holes which engage with the plurality of holes positioned around the perimeter of the opening allowing the position of the mounting plate on the mount cross brace to be adjusted.

10. The camera mounting system for inspection of a barge according to claim 7 wherein the mounting plate is configured with a set of pin holes which engage with the plurality of holes positioned around the perimeter of the opening allowing the position of the mounting plate on the mount cross brace to be adjusted.

11. The camera mounting system for inspection of a barge according to claim 5 wherein the body of the mount cross brace is configured to be pinned to the second support frame with an adjustable knob positioned in the slot and connecting the first side support, the adjustable knob configured to allow adjustment of the position of the first support frame to the second support frame.

12. The camera mounting system for inspection of a barge according to claim 11 wherein the mounting plate is configured with a set of pin holes which engage with the plurality of holes positioned around the perimeter of the opening allowing the position of the mounting plate on the mount cross brace to be adjusted.

13. The camera mounting system for inspection of a barge according to claim 12 wherein the mounting plate is configured with a set of pin holes which engage with the plurality of holes positioned around the perimeter of the opening allowing the position of the mounting plate on the mount cross brace to be adjusted.

14. The camera mounting system for inspection of a barge according to claim 1 wherein the body of the mount cross brace is configured with at least one side hook for engagement with either the first support frame or the second support frame.

15. The camera mounting system for inspection of a barge according to claim 1 wherein the body of the mount cross brace is fixed to the first support frame and the second support frame.

16. The camera mounting system for inspection of a barge according to claim 15 wherein the mounting plate is configured with a set of pin holes which engage with the plurality of holes positioned around the perimeter of the opening allowing the position of the mounting plate on the mount cross brace to be adjusted.

17. The camera mounting system for inspection of a barge according to claim 16 wherein the mounting plate is configured with a set of pin holes which engage with the plurality of holes positioned around the perimeter of the opening allowing the position of the mounting plate on the mount cross brace to be adjusted.

18. The camera mounting system for inspection of a barge according to claim 1 wherein the body of the mount cross brace is configured with at least one side hook for engagement with either the first support frame or the second support frame.

19. A camera mounting system for inspection of a barge hold comprising:

a) an L-shaped support frame, the support frame further comprised of:
  i. a first support frame having a first end and a second end, wherein the first support frame is configured to engage with and rest upon a first portion of a perimeter of a barge portal positioned above a barge hold;
  ii. a second support frame having a first end and a second end, wherein the second end of the first support is connected to the second end of the second support frame, wherein the second support frame is configured to engage with and rest upon a second portion of the perimeter of the barge portal positioned above the barge hold;
b) a mount cross brace, the mount cross brace further comprised of:
  i. a body having a generally triangular shape with a first support surface and a second support surface positioned across the body, wherein the first support surface is configured to rest upon the first support frame and the second support surface is configured to rest upon the second support frame;
  ii. an opening formed in the body having a perimeter and creating a u-shaped void proximate a center of the body, wherein a plurality of holes are positioned around the perimeter of the opening;
  iii. a slot, the slot positioned in the body and between the first support surface and the second support surface, the slot configured to allow adjustment of the position of the first support frame in relation to the second support frame;
c) a mounting plate configured to fit upon the opening and having an aperture positioned therein; and,
d) a camera tube, the camera tube configured to connect an upper end configured with a handle and a lower end configured for attachment of a camera, wherein the camera tube is configured to be positioned in the mounting plate aperture and engage the mount cross brace via the opening to support the camera for inspection of the barge hold and a camera cord may be positioned in the camera tube.

20. The method of mounting a camera for inspection of a barge hold comprising:
a) configuring a lower side of a first support frame and a lower side of a second support frame for engagement with a portion of a barge hatch above a barge hold, wherein the first support frame and the second support frame are connected and an angle is formed therein;
b) configuring a mount cross brace to rest upon and attach to and between an upper side of the first support frame and upper side of the second support frame, wherein an opening is formed in the mount cross brace forming a u-shaped void;
c) positioning a mounting plate having an aperture therein upon the opening; and,
d) attaching a camera to the camera tube and inserting the camera tube into the aperture of the mounting plate and positioning the camera tube into the opening of the mount cross brace wherein the camera is positioned in the barge hold for visual inspection of the barge hold.

* * * * *